(12) United States Patent
Chatterjee et al.

(10) Patent No.: US 8,260,744 B1
(45) Date of Patent: Sep. 4, 2012

(54) METHOD, SYSTEM, APPARATUS, AND COMPUTER-READABLE MEDIUM FOR TAKING AND MANAGING SNAPSHOTS OF A STORAGE VOLUME

(75) Inventors: Paresh Chatterjee, Fremont, CA (US); Vijayarankan Muthirisavenugopal, Fremont, CA (US); Srikumar Subramanian, Fremont, CA (US); Ajit Narayanan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 532 days.

(21) Appl. No.: 12/042,705

(22) Filed: Mar. 5, 2008

Related U.S. Application Data

(63) Continuation of application No. 11/255,146, filed on Oct. 20, 2005, now Pat. No. 7,373,366.

(60) Provisional application No. 60/689,587, filed on Jun. 10, 2005, provisional application No. 60/689,471, filed on Jun. 10, 2005.

(51) Int. Cl.
*G06F 7/00* (2006.01)
*G06F 17/00* (2006.01)

(52) U.S. Cl. ...................................... 707/639
(58) Field of Classification Search .................. 711/161, 711/162; 707/639
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,530,850 A | 6/1996 | Ford et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,298,425 B1 | 10/2001 | Whitaker et al. | |
| 6,311,193 B1 | 10/2001 | Sekido | |
| 6,434,681 B1 | 8/2002 | Armangau | |
| 6,460,054 B1 | 10/2002 | Grummon | |
| 6,484,186 B1 | 11/2002 | Rungta | |
| 6,665,815 B1 * | 12/2003 | Goldstein et al. | 714/20 |
| 6,668,264 B1 | 12/2003 | Patterson et al. | |
| 6,748,504 B2 * | 6/2004 | Sawdon et al. | 711/162 |
| 6,892,211 B2 | 5/2005 | Hitz et al. | |

(Continued)

OTHER PUBLICATIONS

US 6,988,220, 01/2006, Eng et al. (withdrawn).

(Continued)

*Primary Examiner* — Greta Robinson
*Assistant Examiner* — Jeffrey Chang
(74) *Attorney, Agent, or Firm* — McKeon, Meunier, Carlin & Curfman, LLC

(57) ABSTRACT

A method, system, apparatus, and computer-readable medium are provided for taking snapshots of a storage volume. According to aspects of one method, each snapshot is represented as a unique sequence number. Every fresh write access to a volume in a new snapshot lifetime is allocated a new section in the disk, called a provision, which is labeled with the sequence number. Read-modify-write operations are performed on a sub-provision level at the granularity of a chunk. Because each provision contains chunks with valid data and chunks with invalid data, a bitmap is utilized to identify the valid and invalid chunks with each provision. Provisions corresponding to different snapshots are arranged in a linked list. Branches from the linked list can be created for storing writable snapshots. Provisions may also be deleted and rolled back by manipulating the contents of the linked lists.

21 Claims, 19 Drawing Sheets

U.S. PATENT DOCUMENTS

| | | | |
|---|---|---|---|
| 6,934,727 B2 | 8/2005 | Berkowitz et al. | |
| 7,072,916 B1 | 7/2006 | Lewis et al. | |
| 7,111,026 B2 | 9/2006 | Sato | |
| 7,225,210 B2 | 5/2007 | Guthrie, II | |
| 7,243,115 B2 | 7/2007 | Manley et al. | |
| 7,269,612 B2 * | 9/2007 | Devarakonda et al. | 707/694 |
| 7,363,444 B2 * | 4/2008 | Ji | 711/161 |
| 7,373,366 B1 | 5/2008 | Chatterjee et al. | |
| 7,555,504 B2 | 6/2009 | Bixby et al. | |
| 7,603,391 B1 | 10/2009 | Federwisch et al. | |
| 7,617,217 B1 | 11/2009 | Chen et al. | |
| 7,680,842 B2 * | 3/2010 | Anderson et al. | 707/999.204 |
| 7,707,183 B2 | 4/2010 | Alstrin et al. | |
| 2003/0126242 A1 | 7/2003 | Chang | |
| 2004/0030727 A1 | 2/2004 | Armangau et al. | |
| 2004/0128470 A1 | 7/2004 | Hetzler et al. | |
| 2005/0246503 A1 | 11/2005 | Fair | |
| 2006/0218364 A1 | 9/2006 | Kitamura | |
| 2007/0174690 A1 | 7/2007 | Kambara et al. | |
| 2007/0185940 A1 | 8/2007 | Prahlad et al. | |
| 2007/0266066 A1 | 11/2007 | Kapoor et al. | |
| 2008/0010308 A1 | 1/2008 | Erdogan et al. | |
| 2008/0010322 A1 | 1/2008 | Lee et al. | |
| 2008/0104139 A1 | 5/2008 | Xu et al. | |
| 2008/0183973 A1 | 7/2008 | Aguilera et al. | |

OTHER PUBLICATIONS

Douglis et al., "Log-Structured File Systems," IEEE, 1989, pp. 124-129.

Green et al., "Designing a Fast, On-line Backup System for a Log-Structured File System," Digital Technical Journal, vol. 8, No. 2, 1996, pp. 32-45.

Peterson et al. "Ext3cow: A Time-Shifting File System for Regulatory Compliance," ACM Transactions on Storage, vol. 1, No. 2, May 2005, pp. 190-212.

Rosenblum et al., "The Design and Implementation of a Log-Structured File System," ACM Transactions on Computer Systems, vol. 10, No. 1, Feb. 1992, pp. 26-52.

U.S. Official Action dated Aug. 4, 2006 in U.S. Appl. No. 11/255,146.

U.S. Official Action dated Nov. 17, 2006 in U.S. Appl. No. 11/255,146.

U.S. Official Action dated Aug. 22, 2007 un U.S. Appl. No. 11/255,146.

U.S. Notice of Allowance / Allowability dated Dec. 11, 2007 in U.S. Appl. No. 11/255,146.

U.S. Appl. No. 11/255,146, filed Oct. 20, 2005, entitled "Method, System, Apparatus, and Computer-Readable Medium for Taking and Managing Snapshots of a Storage Volume," Inventors: Chatterjee et al.

U.S. Appl. No. 12/042,710, filed Mar. 5, 2008, entitled "Method, System, Apparatus, and Computer-Readable Medium for Taking and Managing Snapshots of a Storage Volume," Inventors: Chatterjee et al.

U.S. Appl. No. 12/042,715, filed Mar. 5, 2008, entitled "Method, System, Apparatus, and Computer-Readable Medium for Taking and Managing Snapshots of a Storage Volume," Inventors: Chatterjee et al.

U.S. Official Action dated Jul. 8, 2010 in U.S. Appl. No. 12/042,710.

U.S. Official Action dated Jul. 8, 2010 in U.S. Appl. No. 12/013,099.

U.S. Official Action dated May 6, 2010 in U.S. Appl. No. 12/042,715.

U.S. Official Action dated Nov. 12, 2010 in U.S. Appl. No. 12/104,116.

U.S. Official Action dated Jan. 20, 2011 in U.S. Appl. No. 12/042,710.

Notice of Allowance dated Mar. 18, 2011 in U.S. Appl. No. 12/042,715.

* cited by examiner

Fig. 12B (AFTER)

Fig. 12A (BEFORE)

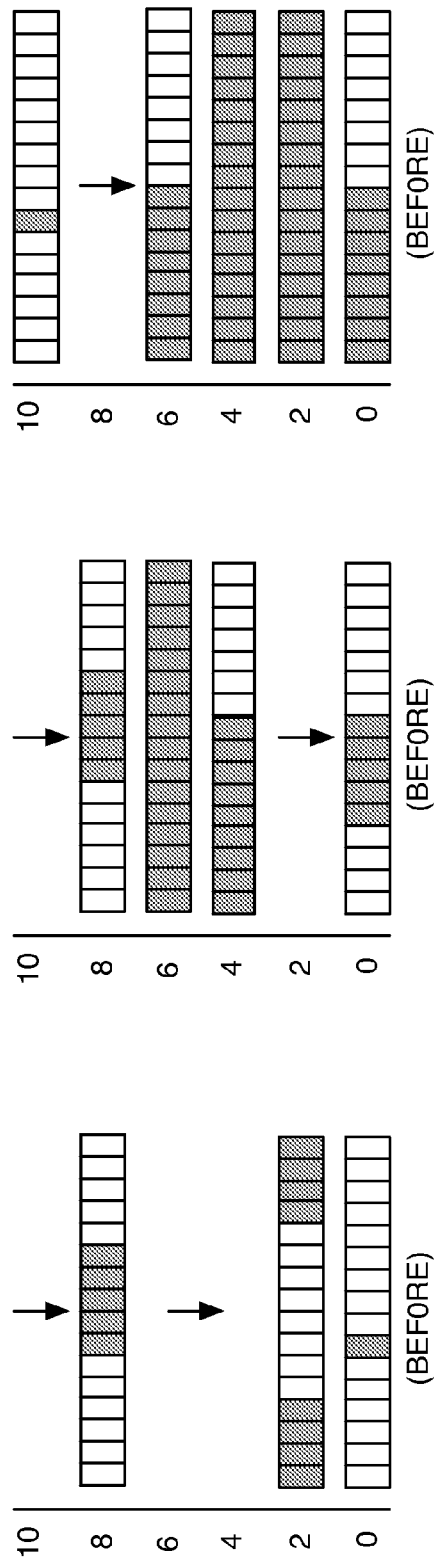
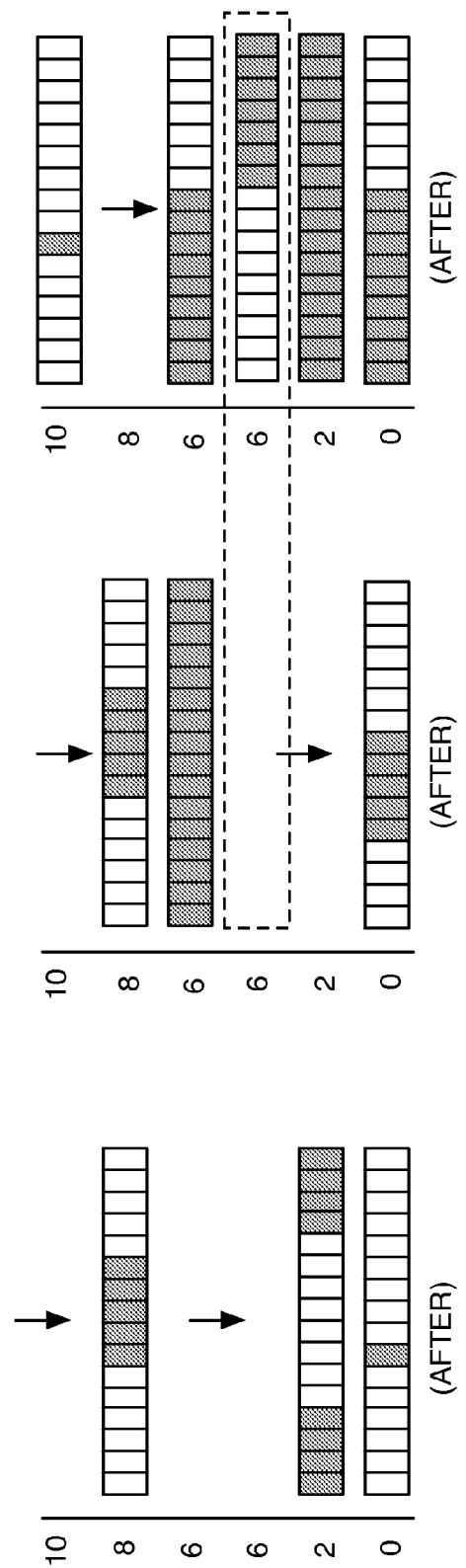
Fig. 16A  Fig. 16B  Fig. 16C

METHOD, SYSTEM, APPARATUS, AND COMPUTER-READABLE MEDIUM FOR TAKING AND MANAGING SNAPSHOTS OF A STORAGE VOLUME

CROSS-REFERENCE TO RELATED APPLICATIONS

This patent application is a continuation of U.S. patent application Ser. No. 11/255,146, entitled "Method, System, Apparatus, and Computer-Readable Medium for Taking and Managing Snapshots of a Storage Volume," filed Oct. 20, 2005 now U.S. Pat. No. 7,373,366, which claims the benefit of U.S. provisional patent application No. 60/689,587, filed on Jun. 10, 2005, and U.S. provisional patent application No. 60/689,471, also filed on Jun. 10, 2005, all three of which are expressly incorporated herein by reference in their entirety.

TECHNICAL FIELD

The present invention is related to the field of computer data storage systems. More particularly, the present invention is related to the field of taking and managing snapshots of a storage volume in a data storage system.

BACKGROUND OF THE INVENTION

In the data storage industry, snapshots have become a preferred method of protecting a data storage volume against inadvertent data loss and for performing background backups. A snapshot is a read-only volume that is a point-in-time image of a data storage volume that can be created, mounted, deleted, and rolled back onto the data storage volume arbitrarily. Snapshots are utilized extensively in the data storage industry for security, backup, and archival purposes.

Snapshots are typically implemented in the data storage industry utilizing a technology called copy-on-write ("COW"). When a snapshot is taken utilizing a COW algorithm and a new write arrives at a logical location at which data was written before the snapshot, a copy is made of the old data at a new location before the new data is written to the old location. Some metadata is also written to keep track of the fact that the old data has been copied to a new location.

One major drawback of the existing methods for performing snapshots is that the required input/output operations impose significant performance penalties when snapshots are currently active. This is because snapshots implemented utilizing the COW algorithm must perform three input/output operations for each new read/write request that arrives to the system: 1) a read from the original location of the old data; 2) a write to a snapshot location for the old data; and 3) a write to the original location for the new data. Two of these input/output operations are to the same location, thereby increasing rotational latency. Additionally, a number of sparse metadata writes must be performed in both cases. The combination of the rotational delay due to the double I/O at the same location and the overall delay results in performance penalties of a factor of at least twenty for each snapshot taken in some contemporary implementations. If multiple snapshots are active, most contemporary systems exhibit such severe performance degradation that taking more than four or five concurrent snapshots becomes impractical.

In addition to the significant performance penalties, current systems for taking snapshots in a data storage system are also limited in the features they provide. For instance, current systems do not allow the arbitrary creation of snapshots with effectively imperceptible delay imposed between the creation of snapshots, do not allow users to quickly delete snapshots to reclaim space without effecting newer or older snapshots and without contributing perceptibly to the input/output load of the system, and do not permit snapshots to be "rolled back" to any earlier snapshot without making the system unavailable for a length of time, or even having to take the system down entirely. Current systems also do not support the mounting of arbitrary snapshots or the creation of "writable snapshots," which are branches off of any snapshot and that share data with the parent snapshot but not necessarily with the parent volume.

It is with respect to these considerations and others that the present invention has been made.

SUMMARY OF THE INVENTION

In accordance with the present invention, the above and other problems are solved by a method, system, apparatus, and computer-readable medium for taking and managing snapshots of a data storage volume. Through the embodiments of the invention, snapshots may be taken of a data storage volume without the performance penalties imposed by previous solutions. Moreover, advanced features not provided by previous solutions are also made possible through the embodiments of the invention, including the ability to delete snapshots without significant performance penalties, the ability to quickly roll a volume back to an earlier snapshot, and the ability to create writable snapshots.

According to one method provided by an embodiment of the invention, a linked list is maintained for each logical unit of allocation (referred to herein as a "provision") in a data storage volume. The linked list includes zero or more nodes, each of which corresponds to a particular snapshot lifetime in which the provision was written to. A snapshot lifetime is the period of time that a particular snapshot is active. Each snapshot lifetime is uniquely associated with an increasing sequence number that identifies the snapshot lifetime. Each node in the linked list includes a first data field for storing the sequence number for the provision, a pointer to the next node in the linked list, and a bitmap for storing data identifying each of the sub-portions (referred to herein as "chunks") of the provision that were written to during the snapshot lifetime of the provision. The bitmap is utilized for a variety of purposes, including determining the particular provision that should be utilized to fetch data for a read request. According to embodiments of the invention, a snapshot may be deleted and a volume may be rolled back to a snapshot only by manipulating the contents of the linked list. The linked list data structure also makes possible performant reads and writes and the ability to create writable snapshots.

According to aspects of the invention, a new node is added to the linked list each time a write request is received for the corresponding logical provision for the first time during a new snapshot lifetime. When a request is received to read from a logical provision, the list is iterated to locate a node in the list having the highest sequence number and that has valid data for the requested portion of the provision as indicated by the contents of the bitmap. Once the appropriate node has been located, the appropriate data can be read from the physical location corresponding to the located node.

According to other aspects of the invention, the methods and systems provided herein for taking and managing snapshots operate in conjunction with an algorithm for allocating available physical storage space on demand (also referred to herein as a "thin provisioned" system). In a thin provisioned system, physical storage space is allocated only when writes are received at the logical volume. Similarly, as described herein, storage space for storing snapshots may also be allocated when a write operation is received at a provision that was allocated and written to during a previous snapshot lifetime.

According to other aspects of the invention, a data structure may be maintained for the provisions within a logical data storage volume. The data structure includes a first data field for storing a sequence number identifying the snapshot lifetime in which the provision was written. The data structure also includes a second data field for storing a bitmap identifying the portions of the provision that were written to during the snapshot lifetime identified by the contents of the first data field. The data structure also includes a third data field for storing a pointer to a next data structure storing information for another snapshot lifetime for the provision.

According to embodiments, a request may be received to perform a write operation on a provision within the logical data storage volume. In response to such a request a determination is made, based on the contents of the data structure for the provision, as to whether the provision was allocated and written to during a previous snapshot lifetime or during the current lifetime. If it was allocated in a previous snapshot lifetime, or was never allocated, a new provision is allocated for the new write operation and the write is performed in the new provision. A new data structure is created for the new provision. The first data field of the new data structure is updated to reflect the current snapshot lifetime. The second data field is updated to reflect the portions of the new provision that were modified during the write operation. The third data field is updated to point to the data structure corresponding to the provision for the previous snapshot lifetime.

According to other aspects, it may be necessary to migrate data from a particular chunk of a provision from a previous snapshot lifetime prior to performing a write operation. This occurs, for instance, when a portion of a chunk has been written to in the immediately preceding snapshot lifetime, and a current write request is received that modifies only a sub-chunk portion. In these instances, it is necessary to perform a read-modify-write operation to migrate the previous contents of the chunk from the next previous snapshot lifetime to the current snapshot lifetime.

According to other aspects of the invention, the data structure may be utilized to quickly respond to read requests from a logical provision during any snapshot lifetime. In particular, when a request is received to read a portion of a logical provision, the data structures are iterated to locate the data structure having the highest sequence number in the first data field and that has valid data for the chunk of the provision to be read as indicated by the bitmap. Once such a data structure has been located, the requested read operation may be performed on the provision identified by the located data structure. In this manner, multiple snapshots may be mounted and read from concurrently.

According to other aspects, a request may be received to delete a snapshot. In response to such a request, each data structure is identified that has a sequence number stored in the first data field equivalent to the sequence number to be deleted. For each chunk in such data structures, a further determination is made as to whether a data structure exists having the next incremental sequence number that also corresponds to the same logical provision in which the chunk is valid. If such a data structure exists having a newer sequence number, this implies that future snapshots and the volume are not dependent on this chunk, and the chunk is deleted by resetting each bit in the second data field of a data structure for a prior sequence number corresponding to the same provision as the identified data structure that is also set in the second data field as the identified data structure. If all of the bits in the second data field of the identified data structure have been reset, then the identified data structure is deleted. If all of the bits have not been reset, the sequence number in the first data field of the identified data structure is changed to a next possible sequence number.

According to other aspects of the invention, the data structure may also be utilized to provide writable snapshots. Writable snapshots are volumes that are uniquely associated with a snapshot, and have the same data as the corresponding snapshot, but that can be written to without affecting either the snapshot or the data volume. In order to implement writable snapshots, certain sequence numbers are reserved for read-only snapshots and certain sequence numbers are reserved for writable snapshots. For example, even numbers may represent read-only snapshots in the volume, whereas odd numbers may represent the writable snapshots. Writable snapshots share the same provisions as snapshots with lower or equal sequence numbers but form an independent tree from the sequence numbers that are higher. In this manner, writable snapshots create a branch off of the tree formed by the linked list of data structures. In order to read from writable snapshots, therefore, the presence of higher sequence numbers is ignored. Write operations can be performed in the same manner as for a read-only snapshot.

According to other aspects of the invention, a request may be received to roll back a volume to a previous snapshot. Roll back from a read-only snapshot can be performed near instantaneously since the only operation that needs to be performed is to change the sequence number of the currently active volume to the sequence number to roll back to.

Writable snapshots can also be rolled back by changing the sequence number for each provision in the writable snapshot to the next available read-only snapshot sequence number. As soon as this operation is complete, the writable snapshot has been rolled back onto the volume. Provisions with a higher sequence number than the one being rolled back to are deleted summarily.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 16A-16C are data structure diagrams showing several illustrative new writes bitmaps utilized in conjunction with an operation for deleting snapshots in an embodiment of the invention;

DETAILED DESCRIPTION OF THE INVENTION

Figure 1:
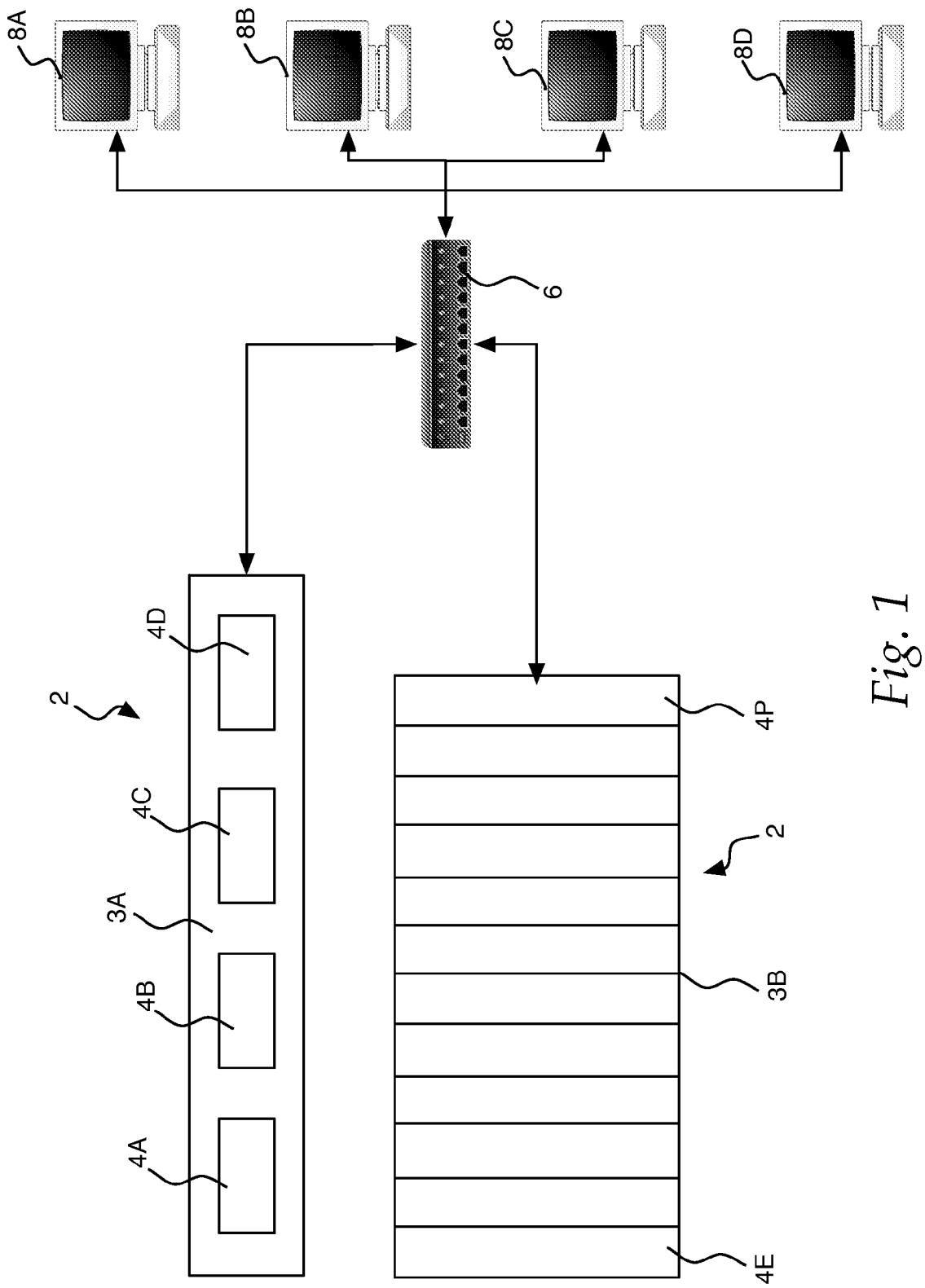
FIG. 1 is a computer architecture diagram showing aspects of a computer network utilized as an illustrative operating environment for the various embodiments of the invention.

Embodiments of the present invention provide a method, system, apparatus, and computer-readable medium for taking and managing snapshots of a data storage volume. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 2:
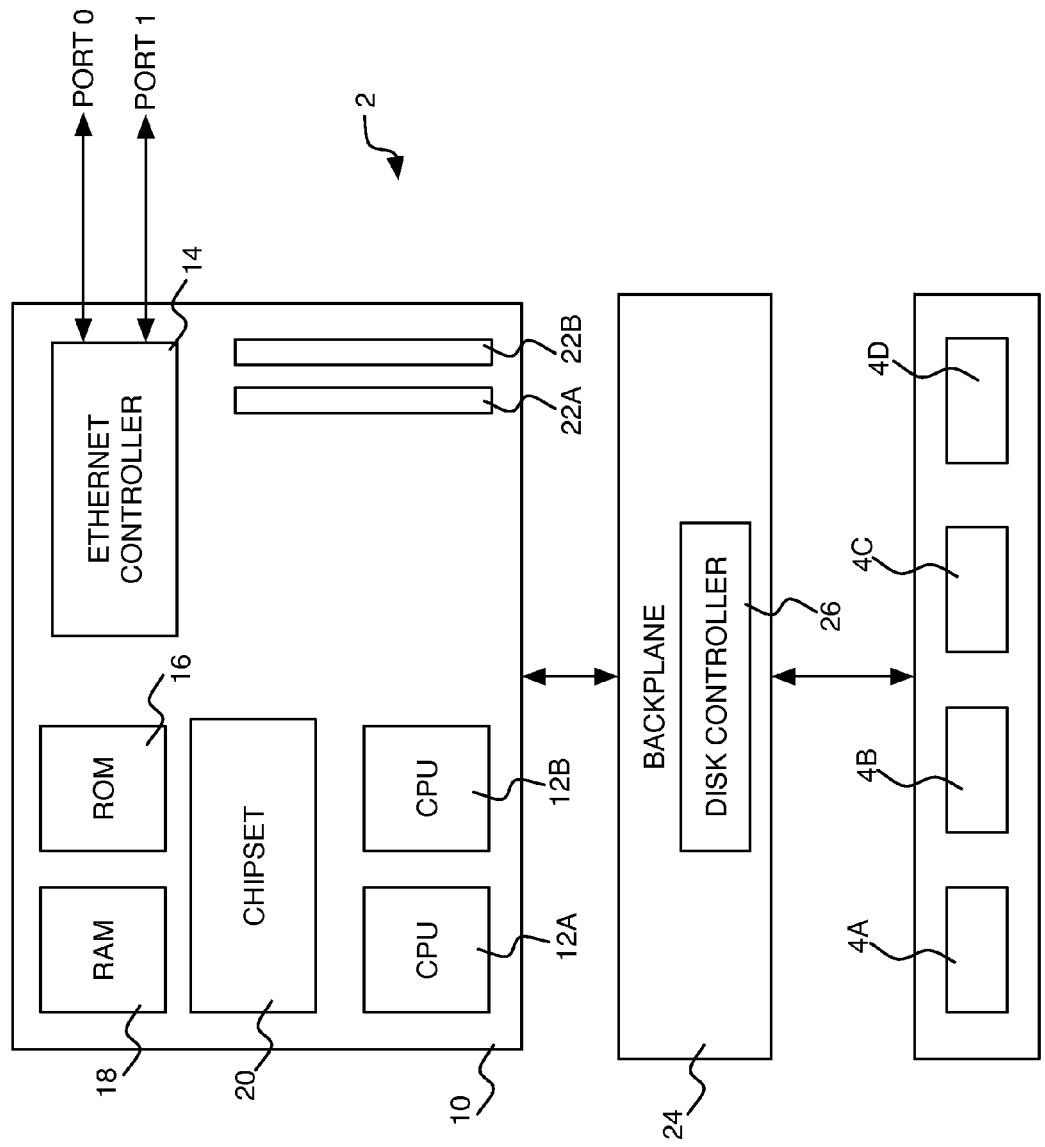
FIG. 2 is a computer architecture and network diagram illustrating aspects of a storage server computer provided by the various embodiments of the invention.
Figure 3:
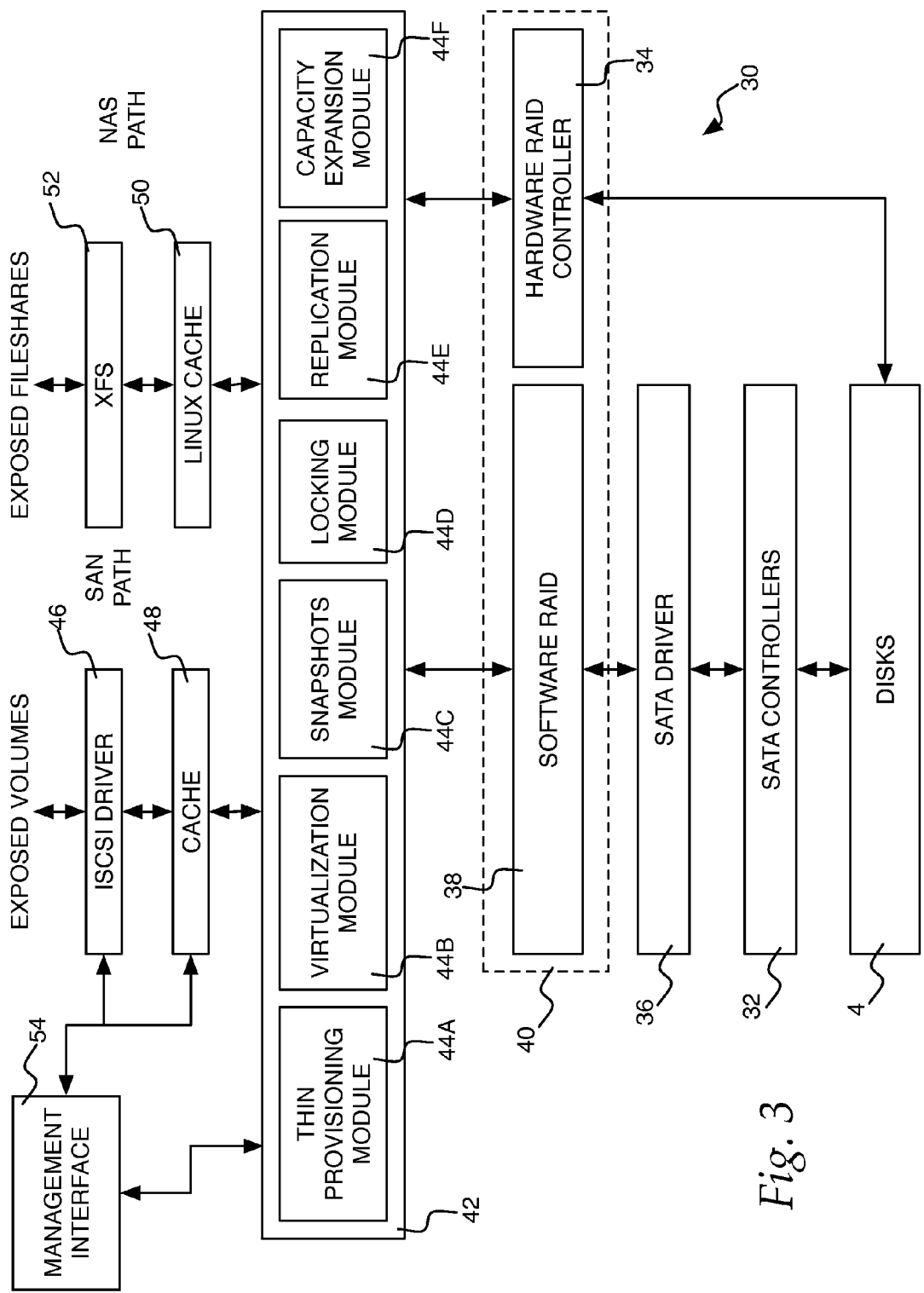
FIG. 3 is a software architecture diagram illustrating various aspects of a storage stack utilized by a storage server provided in embodiments of the invention.

FIGS. 1-3 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. While the invention will be described in the general context of program modules that execute in conjunction with an operating system on a computer system, those skilled in the art will recognize that the invention may also be implemented in combination with other program modules.

Referring now to FIG. 1, an illustrative operating environment for the various embodiments of the present invention will be described. As shown in FIG. 1, the embodiments of the invention described herein may be implemented in a storage server computer 2 that is operative to receive and respond to requests to read and write data to a mass storage device, such as a hard disk drive. According to embodiments of the invention, the storage server computer 2 may be housed in a one rack space unit 3A storing up to four hard disk drives 4A-4D. Alternatively, the storage server computer may be housed in a three rack space unit 3B storing up to twelve hard disk drives 4E-4P. Other types of enclosures may also be utilized that store fewer or more hard disk drives. In this regard, it should be appreciated that the type of storage enclosure and number of hard disk drives utilized is not generally significant to the implementation of the embodiments of the invention. Any type of storage enclosure and virtually any number of hard disk devices or other types of mass storage devices may be utilized without departing from the spirit and scope of the invention.

According to embodiments, the storage server computer 2 includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which the storage server computer 2 is a part, such as fiber channels, Small Computer System Interface ("SCSI"), Serial Attached SCSI ("SAS"), etc.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 2 or may be connected to the storage server computer 2 via a distributed wide area network, such as the Internet. An appropriate protocol, such as the Internet Small Computer Systems Interface ("iSCSI") protocol may be utilized to enable the initiators 8A-8D to communicate with and utilize the various functions of the storage server computer 2 over a wide area network such as the Internet.

According to the various aspects of the invention, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to the clients. In particular, the storage server computer may provide redundant array of inexpensive disks ("RAID") functionality for the hard disk drives 4A-4P. The storage server computer 2 may also allow the hard disk drives 4A-4P to be partitioned into logical volumes for access by the initiators 8A-8D. Additional advanced features described herein, such as thin provisioning and snapshots, may also be provided by the storage server computer 2.

Turning now to FIG. 2, an illustrative computer hardware architecture for practicing the various embodiments of the invention will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus port ("USB"), not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciate that, although not illustrated in FIG. 2, a RAID controller may also be embedded on the motherboard 10 or implemented in software by the storage server computer 2. It is also contemplated that the storage server computer 2 may include other components that are not explicitly shown in FIG. 2 or may include fewer components than illustrated in FIG. 2.

As described briefly above, the motherboard 2 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 18 and a ROM 16. The ROM 16 may store a basic input/output system or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments of the invention will now be described. In particular, FIG. 3 illustrates a storage stack 30 utilized in the embodiments of the invention. At the top of the storage stack 30, storage volumes or fileshares are exposed to the initiators 8A-8D. At the bottom of the storage stack 30 are the actual mass storage devices, such as the disks 4, that are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a device driver 42 that implements the functions described herein. In particular, the device driver 42 may provide functionality for implementing thin provisioning, virtualization, snapshots, locking, replication, and capacity expansion. These features are implemented by the modules 44A-44F, respectively, and are described in greater detail herein. In particular, the thin provisioning module 44A provides the functionality described herein for allocating physical capacity to logical volumes on an as-needed basis. Additional details regarding the operation of the thin provisioning module 44A are provided below with respect to FIGS. 4-7. The virtualization module 44B provides functionality for creating virtual tape libraries. The snapshots module 44C provides functionality for creating, utilizing, and managing point in time snapshots of the contents of logical storage volumes. Additional details regarding the aspects of the invention for taking and managing snapshots are provided below with respect to FIGS. 8-19. The locking module 44D provides functionality for synchronizing input/output operations in a computer system that utilizes snapshots. The replication module 44E provides functionality for replication from the computer 2 to another computer in the network. The capacity expansion module 44F provides functionality for adding storage capacity to the computer 2.

Above the device driver 42, a number of software components are utilized depending upon the access mechanism utilized to access the data stored on the hard disk drives 4. In particular, a Storage Area Network ("SAN") path is provided that utilizes a cache 48 and a Internet Small Computer Systems Interface ("iSCSI") driver 46. A Network Attached Storage ("NAS") path is also provided that utilizes a LINUX cache 50 and a high-performance journaling file system 52. Volumes are exposed through the SAN path while fileshares are exposed through the NAS path.

It should be appreciated that the device drive 42 comprises a LINUX-compatible mass storage device driver in embodiments of the invention. However, although the embodiments of the invention are described as being implemented within a LINUX-compatible device driver, the various aspects of the invention may be implemented at different points within the storage stack and in conjunction with other operating systems. For instance, the aspects of the invention may be implemented with the FREEBSD operating system or with the WINDOWS family of operating systems from MICROSOFT CORPORATION of Redmond, Wash.

According to embodiments of the invention, a management interface 54 may also be provided for controlling and monitoring the various aspects of the present invention. The management interface communicates with the various layers through software interfaces to retrieve performance data, provide configuration data, and to perform other functions.

Figure 4:
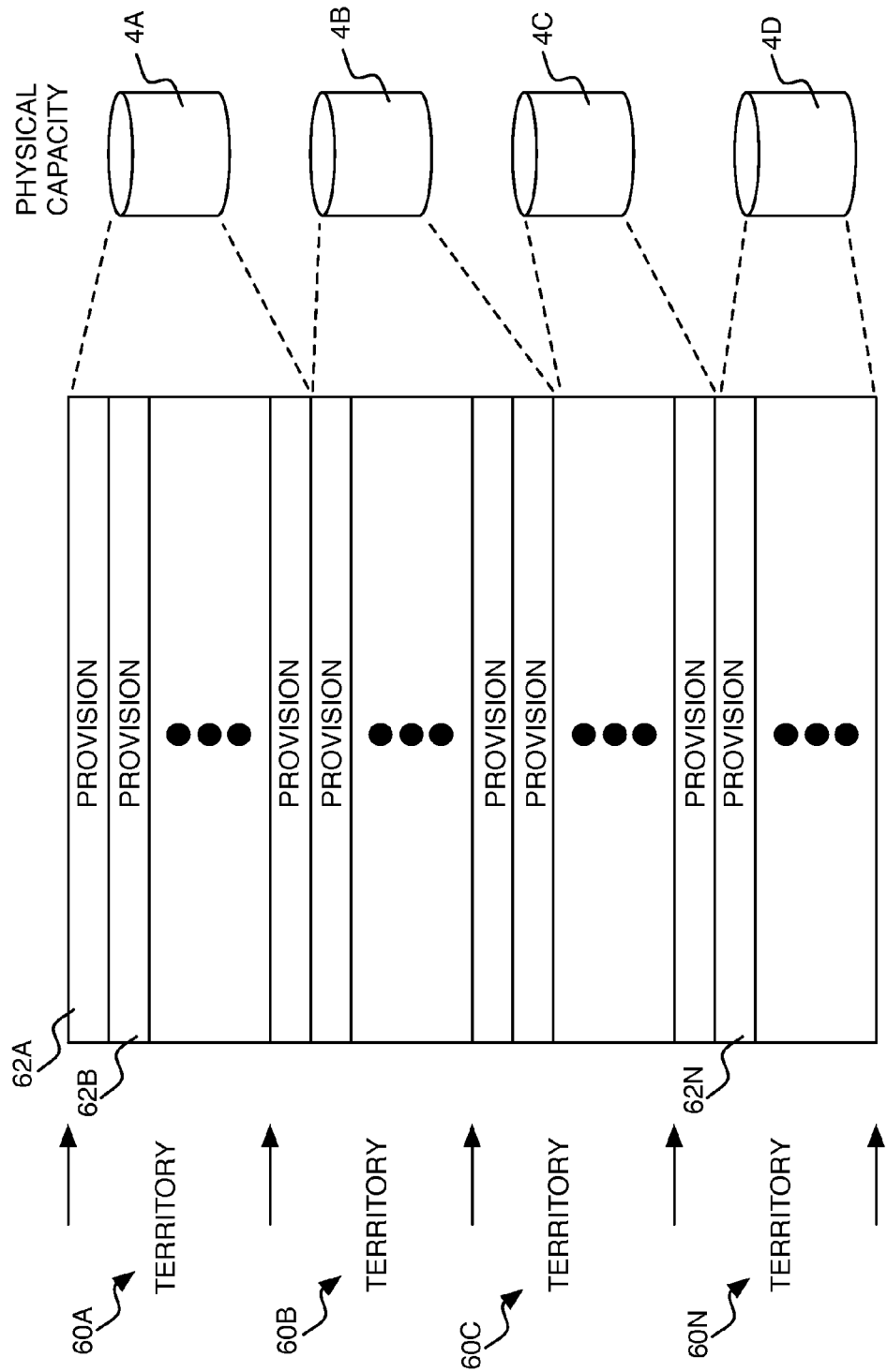
FIG. 4 is a block diagram illustrating a process for dividing the physical capacity of a data storage server computer into provisions and territories according to aspects of the invention.

Referring now to FIG. 4, additional details regarding the division of the physical capacity of the computer 2 into provisions 62A-62N and territories 60A-60N will be provided. As shown in FIG. 4, the available physical capacity of the computer 2 is made up of a number of hard disk drives 4A-4D. It should be appreciated that other computer nodes connected to the computer 2 may also contribute physical capacity to the available physical capacity of the computer 2. As also shown in FIG. 4, the available physical capacity is divided into a number of unique, equally sized areas, called territories 60A-60N. As will be described in greater detail herein, physical space is provisioned when new write operations are received in areas having the size of a territory. Additionally, physical space is also allocated for snapshots when a new write arrives for a logical provision that was allocated and written to during a previous snapshot lifetime. According to embodiments, the preferred size of a territory is one gigabyte ("GB"). However, it should be appreciated that territories of other sizes may be utilized.

As also shown in FIG. 4, the available physical capacity is further subdivided into units referred to herein as provisions 62A-62N. The provisions 62A-62N comprise unique, equally sized areas of the available physical capacity and are smaller in size than the territories 60A-60N. In particular, according to a preferred embodiment, the provisions 62A-62N are one megabyte ("MB") in size. Accordingly, each territory includes one thousand provisions. It should be appreciated that provisions of other sizes may also be utilized.

It should also be appreciated that by subdividing the available physical capacity of the computer 2 into areas of different sizes, the territories and provisions, the physical capacity may be provisioned in units of different sizes when appropriate. For instance, as will be described in greater detail below, capacity may be provisioned in units of territories in response to new writes being received at a logical volume. Capacity may be allocated in units of provisions when snapshots are being utilized by the computer 2. A storage snapshot is a read-only volume that is a point-in-time image of a volume, and can be created, mounted, deleted, and rolled back onto the volume arbitrarily. When a snapshot is taken, and a new write arrives at a logical location in the volume at which data was already written before the snapshot, physical space is needed to store the new data. The space allocated for the snapshot is allocated in units of provisions. According to embodiments of the invention, space may be allocated for snapshots, if needed, up to half of the limit of the total available physical space. Other limits may be utilized similarly. Additional details regarding the allocation of physical space in territories and provisions and the taking and managing of snapshots are provided below.

Figure 5:
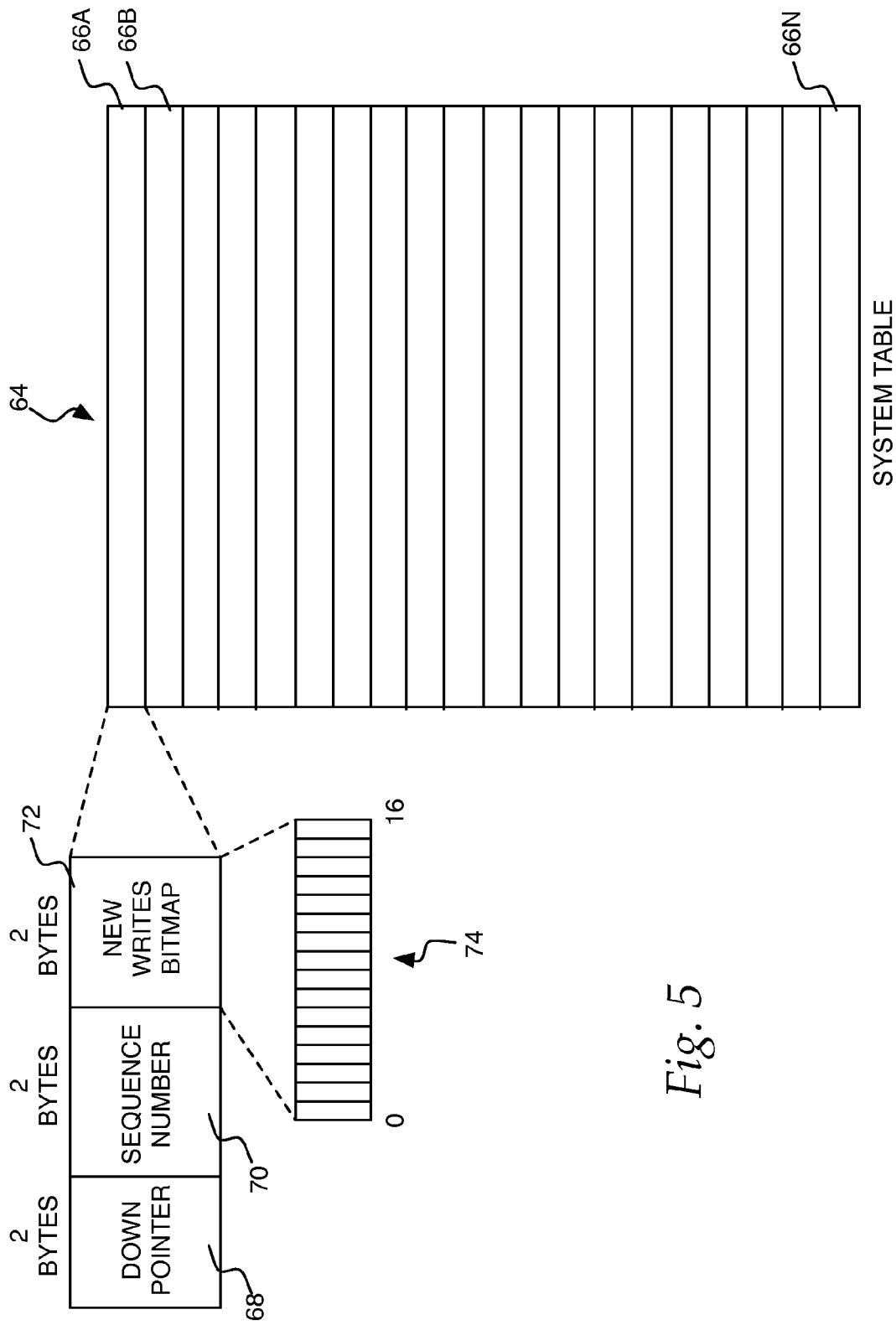
FIG. 5 is a data structure diagram illustrating aspects of a system table data structure provided by embodiments of the invention.

Turning now to FIG. 5, additional details regarding the structure and use of a system table data structure provided by embodiments of the invention will be described. In particular, FIG. 5 illustrates a system table 64 provided by and utilized in the embodiments of the invention. The system table 64 includes a number of entries 66A-66N, each of which is mapped to a unique portion of the available physical storage of the computer 2. If additional physical storage is made available to the computer 2, then additional entries may be added to the system table 64 that correspond to portions of the newly added storage. According to embodiments, each of the entries 66A-66N in the system table 64 correspond to a provision within the available physical storage space of the computer 2.

As also shown in FIG. 5, each entry 66A-66N in the system table 64 contains a number of data fields. In particular, each entry includes a down pointer field 68, a sequence number field 70, and a new writes bitmap field 72. Each of the fields in the system table are utilized when the computer 2 is utilized to not only provide as needed allocation of physical storage space, but also to provide snapshots. In particular, the sequence number field 70 is utilized to specify the snapshot lifetime that a particular provision is allocated in. According to embodiments of the invention, certain sequence numbers are allocated for read-only snapshots and certain sequence numbers are allocated for writable snapshots. For instance, even sequence numbers may be reserved for read-only snapshots while odd sequence numbers are reserved for writable snapshots. The writable snapshot has a sequence number that is one greater than its corresponding read-only snapshot. As discussed in greater detail herein, allocation of sequence numbers in this manner allows writable snapshots to easily be created, mounted, and rolled back onto a volume.

The down pointer field 68 is utilized to store a pointer to another entry in the system table 64 that identifies the next physical provision belonging to the same volume and with the same logical provision number. As described in greater detail below with respect to FIG. 8, the field 68 is utilized to create a linked list of system table entries from which the data for any provision during any snapshot lifetime can be stored and recreated. The new writes bitmap field 72 is utilized to store a bitmap 74 that indicates whether each chunk of the provision is valid or whether newer data exists for the chunk in another provision. According to embodiments of the invention, a chunk comprises a $\frac{1}{16}^{th}$ portion of the provision. For a 1 MB provision, therefore, a chunk comprises a 64 kilobyte ("kB") area. It should be appreciated that the provisions may be divided into chunks of different sizes and that more or fewer bits may be utilized in the bitmap 74 to indicate the portions of a provision that contain valid data for a snapshot lifetime. In this manner, the system table 64 provides information regarding each provision in the computer 2.

The system table 64 is maintained by the computer 2 and stored in the RAM 18 of the computer 2 for fast access. However, it should be appreciated that, according to embodiments of the invention, the entire system table 64 may not be stored in the RAM 18 at one time. In particular, because only the entries of the system table 64 that correspond to allocated portions of the physical storage space are valid, the entire system table 64 is not stored in the RAM 18 all the time. Rather, the system table 64 is allocated territory by territory as described herein, and can therefore be stored in the RAM 18 of the computer 2 as an array of pointers to system table segments, each of which contains the system table for the provisions within a single territory. The volume table data structures described below may be stored in a similar manner. Other methods for storing the system table 64 and the volume tables described below will be apparent to those skilled in the art.

Figure 6:
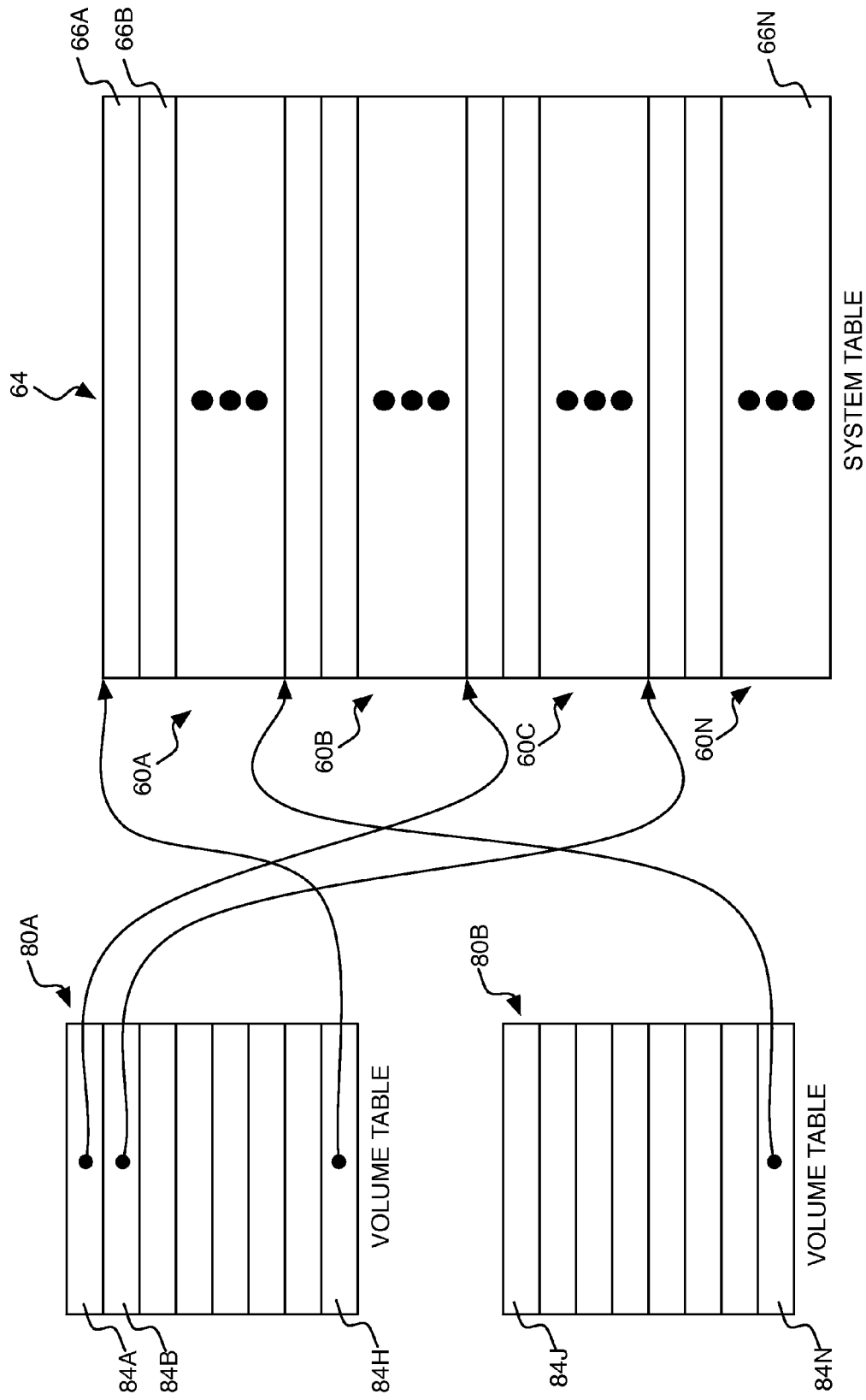
FIG. 6 is a data structure diagram illustrating aspects of a volume table data structure and a system table data structure provided by embodiments of the invention.

Referring now to FIG. 6, additional details regarding the system table and a volume table data structure provided by and utilized in the embodiments of the invention will be described. As shown in FIG. 6, a volume table 80A-80B is utilized for each logical storage volume defined in the computer 2. The volume tables 80A-80B include entries 84A-84H and 84J-84N, respectively, for each territory in a logical volume. For instance, the entry 84A corresponds to the first territory in the volume corresponding to the volume table 80A. Other entries in the volume table correspond to other portions of the logical volume.

Each entry in a volume table 80A-80B can be utilized to store a pointer to a territory in the system table 64. The pointer is created when physical space for the logical territory in the volume is allocated. For instance, a first write request may be received that is directed to the territory reference by the entry 84H of the volume table 80A. In response to the request, physical space is allocated by creating a pointer in the entry 84H to the next available territory, the territory 60A, in the system table 64. If a second write request is received directed to the territory referenced by the entry 84N in the volume table 80B, space is allocated by creating a pointer in the entry 84N to the next available territory 60B. A third write operation directed to a portion of the volume corresponding to the entry 84A will cause a pointer to be created to the territory 60C. Similarly, a fourth write operation that is directed to a portion of the volume corresponding to the entry 84B will cause a pointer to be created to the territory 60N referenced by the system table 64. In this manner, physical space is allocated for logical territories within volumes on an as needed basis.

It should be appreciated that, according to embodiments of the invention, the territories within a volume may be alternately allocated from storage devices connected to different hosts. For instance, storage for the even numbered territories within a volume may be allocated from physical devices connected to a first node, while storage for the odd numbered territories within the volume may be allocated from physical devices connected to a second node. Allocating storage for territories in this manner can improve read/write performance.

When read operations are received, it is necessary to utilize both the volume table for the corresponding logical volume and the system table to perform the read operation. In particular, the appropriate volume table is examined to determine the location within the system table that refers to the territory where the requested data is stored. From the system table, the start of the physical location containing the requested territory can be determined. The offset within the particular territory can then be utilized to locate the actual data. Additional details regarding this process are described below with reference to FIG. 9.

It should be appreciated that new entries may be added to each of the volume tables, thereby allowing the logical volumes to grow to any size within the available physical capacity. Moreover, it should be appreciated that because the size of logical volumes is only limited by the available physical storage space, it is unnecessary to define the size of the logical volumes in advance. Alternatively, the logical volumes may be defined as any size, even sizes larger than the available physical capacity. This is possible because physical space is allocated only as needed.

Because provisioning physical space in the manner described herein does not actually provide more physical space than actually available to the computer 2, additional physical capacity must be added when write requests can no longer be allocated an available territory. To prevent loss of availability when this occurs, warnings must be provided to a system administrator in advance that space is being depleted. Accordingly, a monitoring function is provided for determining when the total amount of physical space that may be allocated to volumes is below a predefined threshold. Additionally, a monitoring function may also be provided for determining when the amount of space available for allocation to snapshot provisions falls below a predefined threshold. When either of these situations occur, a warning may be generated and transmitted to a system administrator so that additional physical capacity may be added. Additional details regarding this process are provided below with respect to FIG. 9.

It should also be appreciated that when snapshots are active in the computer 2 and a write request is received directed to a provision that was allocated in the manner above and written to during a previous snapshot lifetime, a new provision must be allocated for the snapshot. To accomplish this, a new provision is allocated in the portion of the system table 64 allocated for snapshots and a link is created between the entry in the system table 64 for the new provision and the entry in the system table 64 for the provision during the previous snapshot lifetime. Additional details regarding this process are provided below with respect to FIG. 8.

Figure 7:
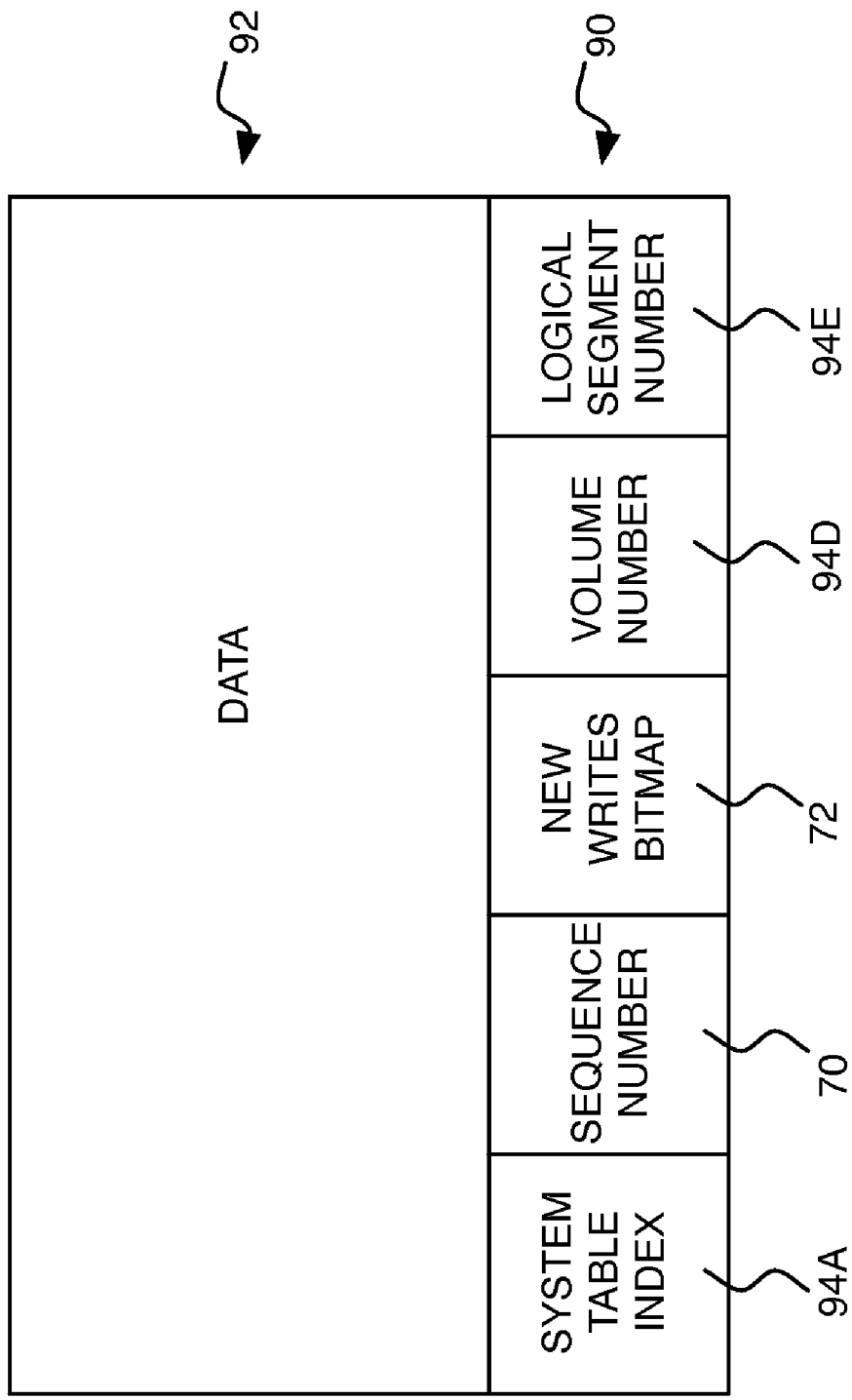
FIG. 7 is a data structure diagram illustrating aspects of a provision table data structure provided by embodiments of the invention.

Turning now to FIG. 7, details regarding a provision table data structure provided by and utilized in the various embodiments of the invention will be described. Because the system table 64 and the volume tables 80 are typically stored in the RAM 18 of the computer 2, the data stored therein is susceptible to loss if power is to fail to the computer 2. While it is possible to write the data described above to disk each time a change is made, the large number of writes required to store all of the data would impose a significant performance penalty. The solution provided by the embodiments of the invention to this problem is to compress the data for each write into a single metadata structure that is maintained consistently on disk, and from which the volume tables and the system table can be reconstructed in the event of a power failure. This data structure is referred to herein as a provision table.

FIG. 7 illustrates a provision table 90 that is provided by the embodiments of the invention. A provision table 90 is associated with each provision and is stored interleaved with the data 92 of the provision. The provision table 90 is written whenever the system table 64 is changed. Because the system table 90 is changed each time a new writes bitmap field 72 changes, a provision table 90 is ultimately written each time the new writes bitmap field 72 for the provision is modified.

The provision table 90 includes a system table index field 94A that identifies the entry in the system table 64 that the provision table 90 corresponds to. The provision table 90 also includes a sequence number field 70 that identifies the sequence number of the snapshot. The provision table 70 also includes the new writes bitmap 72 for the provision, described above. A volume number field 94D and a logical segment number field 94E are also provided within the provision table 90 to identify the volume and segment that the provision belongs to, respectively. The contents of each of the provision tables 90 can be utilized to recreate the system table 64 and the volume tables 80.

An alternative to the use of provision tables for maintaining metadata persistently on disk is a mechanism of logging which may be employed for the same purpose. Every I/O that modifies the system table or the volume tables is described using a small string-like data structure, which may be logged to a certain region on the disk. These logs can be replayed sequentially to recover the tables in the event of a system crash or unclean shutdown.

Figure 8:
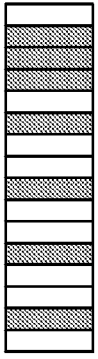
FIG. 8 is a data structure diagram illustrating a territory diagram comprising a linked list of system table entries utilized in embodiments of the invention.

Turning now to FIG. 8, additional details will be provided regarding the allocation of new provisions for snapshots and the data structure utilized to organize the provisions for each snapshot lifetime. In particular, FIG. 8 illustrates a territory diagram 100 that comprises an array of linked lists. Each node 102A-102G in the territory diagram corresponds to an entry in the system table 64. The practice of allocating a fresh provision for each sequence number yields the territory diagram 100 shown in FIG. 8.

As mentioned above, each node 102 in the linked list includes a first data field for storing the provision number that identifies the snapshot lifetime that the provision was allocated in, a second data field for storing the bitmap that identifies the chunks of the provision that were written to in the snapshot lifetime identified by the provision number, and a third data field that includes a pointer to the next node in the linked list. For instance, the node 102A includes a pointer to the node 102B. As will be described in greater detail below, a read operation is performed by iterating through the linked list to locate the provision having the latest sequence number and also having valid data for the requested chunk. Additionally, as will be described herein, typically complex operations such as deleting a snapshot and rolling a snapshot back onto a volume can be performed by simply modifying the contents of the linked list. Additional details regarding these processes are provided below.

Figure 9:
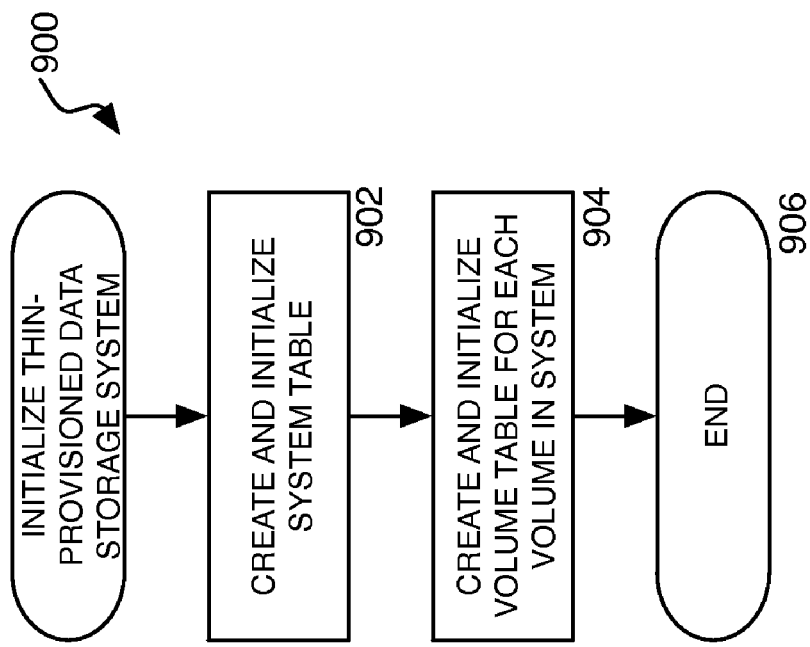
FIG. 9 is a flow diagram illustrating one method for initializing a data storage system provided in embodiments of the invention.

Referring now to FIG. 9, additional details regarding the operation of the computer 2 for provisioning available data storage capacity as needed and for providing functionality for taking and managing snapshots will be provided. In particular, a routine 900 will be described illustrating initialization operations performed by the computer 2. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 9, 11, 13, 15, 17, and 19, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 900 begins at operation 902, where the system table 64 is created and initialized. As described above, the system table 64 is stored in the RAM 18 of the computer 2. Moreover, as also described above, the system table 64 may be stored entirely in the RAM 18 or may be allocated territory-by-territory in the manner described above. As also described above, a portion of the physical storage capacity of the computer 2 and of the system table 64 may be reserved for snapshot provisions. Once the system table has been created and initialized, the routine 900 continues from operation 902 to operation 904.

At operation 904, a volume table 80 is created and initialized for each logical storage volume defined within the computer 2. Because no space has yet been allocated, each entry in the volume table is set to null. Once the volume tables have been created and initialized, the computer 2 is ready to receive and respond to read and write requests. From the operation 904, the routine 900 continues to operation 906, where it ends.

Figure 10:
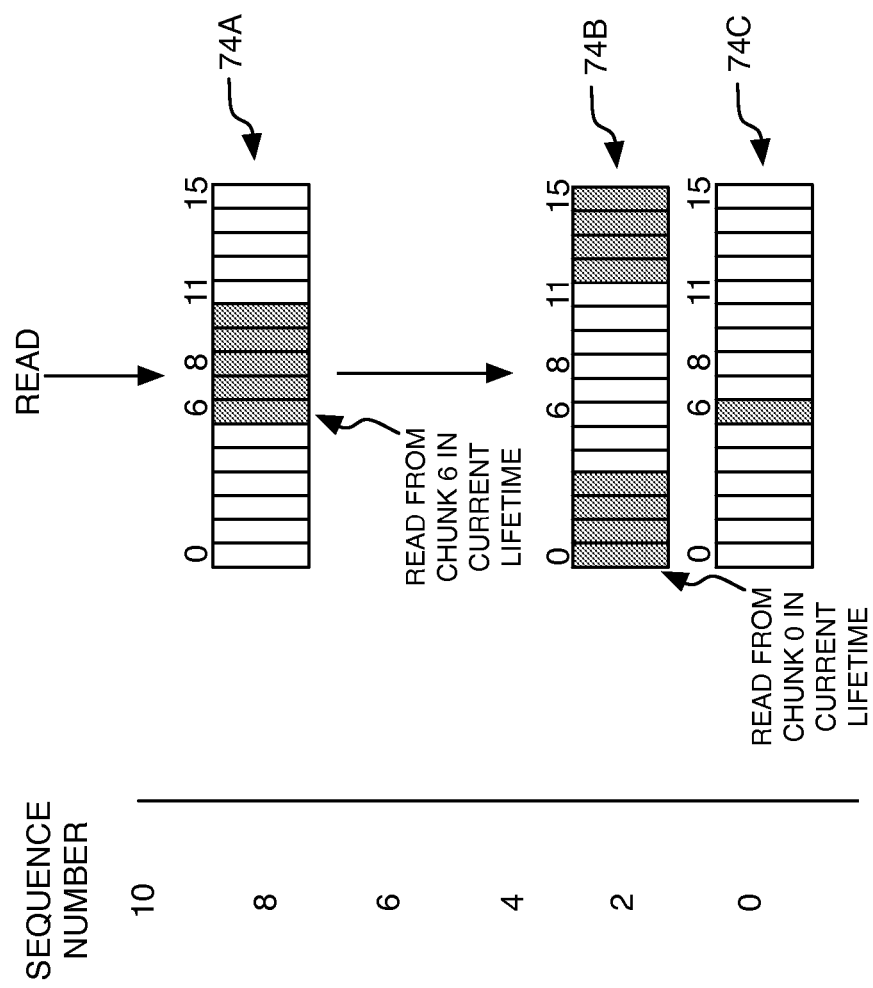
FIG. 10 is a data structure diagram showing several illustrative new writes bitmaps utilized in conjunction with a read operation in an embodiment of the invention.

Turning now to FIG. 10, additional details regarding the processes provided herein for mounting and reading from the current data storage volume or any snapshot will be described. In particular, FIG. 10 shows several bitmaps 74A-74C for a provision during different snapshot lifetimes. For instance, the bitmap 74A is utilized for the provision when the sequence number was eight, the bitmap 74B is utilized when the sequence number was two, and the bitmap 74C is utilized when the sequence number was zero. The current sequence number is ten. When a read request arrives for a particular chunk in a provision, the request is satisfied from the provision having the latest sequence number in which the chunk is valid. This is accomplished by iterating through all of the nodes in the linked list associated with the logical provision and, amongst the nodes that have the bit set for the requested chunk in the bitmap, finding the node with the latest sequence number. This is the provision from which the request is satisfied.

In the example territory diagram fragment shown in FIG. 10, chunk six was first written to when the sequence number was zero and written to again when the sequence number was eight. Therefore, if a read request is received for chunk six in the current snapshot lifetime, the request will be satisfied from the provision written to when the sequence number was eight. Chunk zero was written to when the sequence number was two. Therefore, a read request for chunk zero will be satisfied from the provision written to when the sequence number was two. A read from chunk eleven will return all nulls since chunk eleven was never written to. It should be appreciated that snapshots may also be read from in a similar manner by satisfying read requests from provisions having sequence numbers no higher than the snapshot to be read from. In this manner, the current volume and multiple snapshots may be mounted and read from concurrently.

Figure 11:
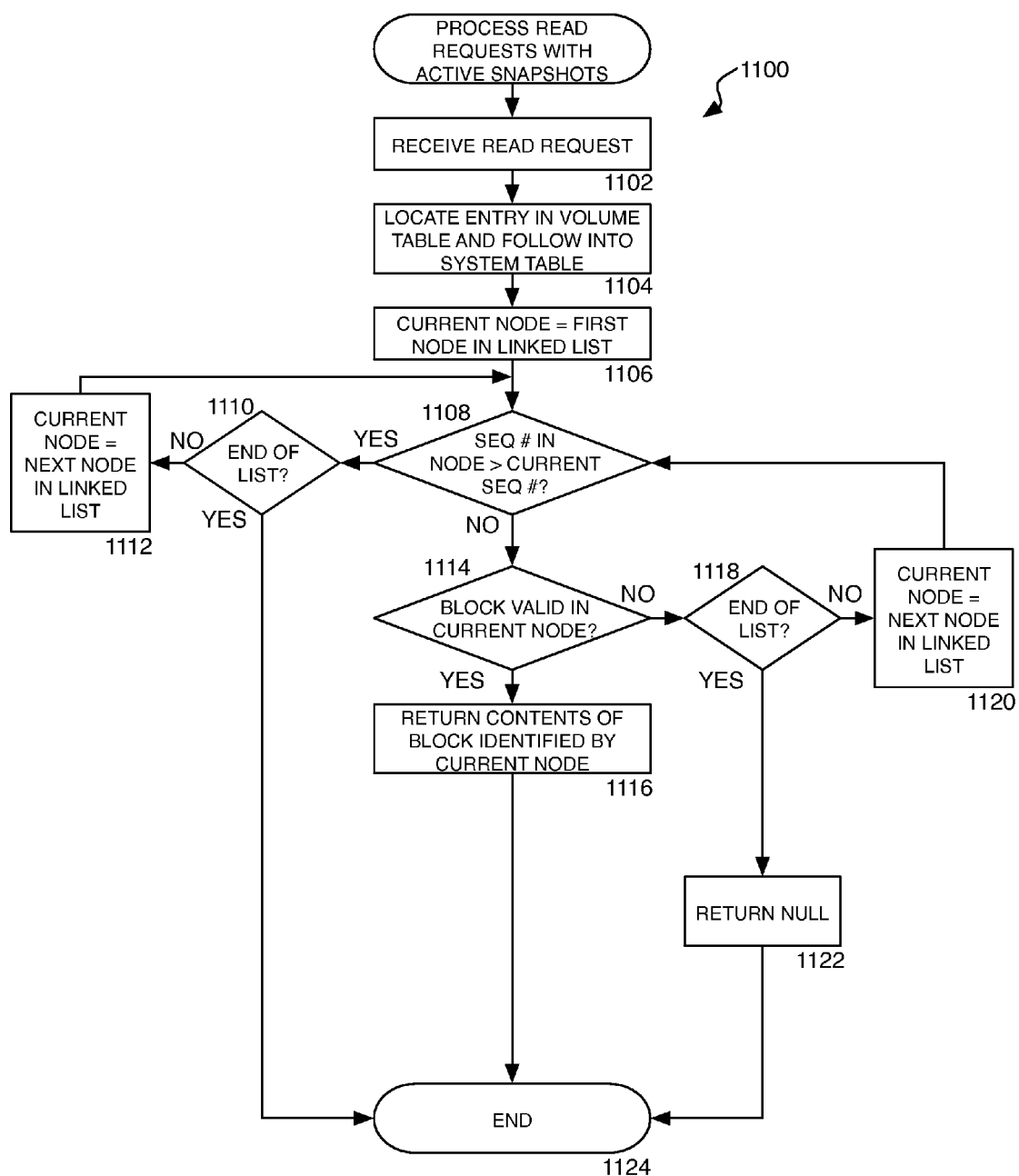
FIG. 11 is a flow diagram illustrating a process for reading from a data storage volume with active snapshots according to one embodiment of the invention.
Figure 12:
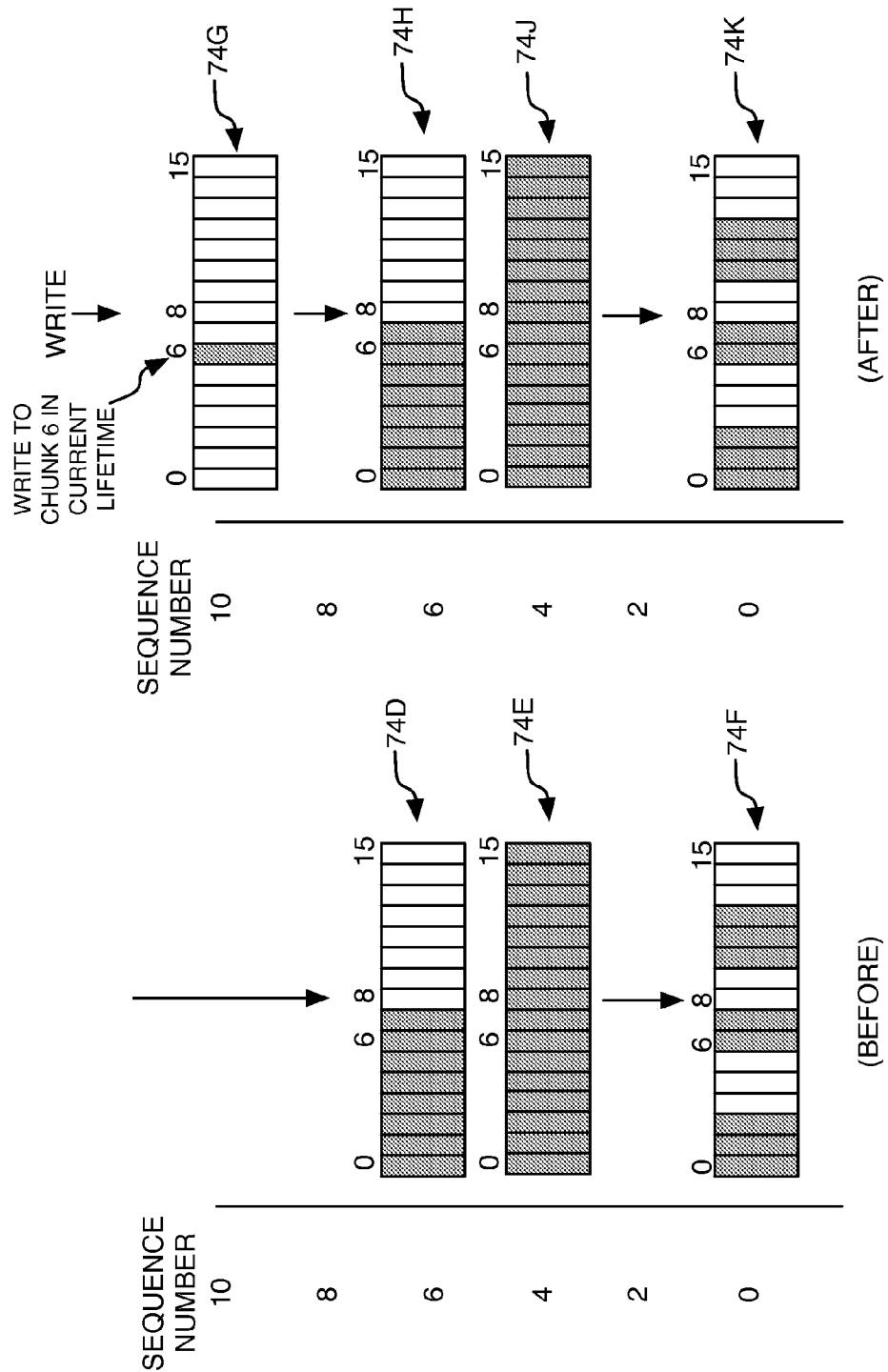
FIGS. 12A-12B are data structure diagrams showing several illustrative new writes bitmaps utilized in conjunction with a write operation in an embodiment of the invention.

Referring now to FIG. 11, an illustrative routine 1100 will be described for processing read requests directed to the current volume or a snapshot. The routine 1100 begins at operation 1102, where the read request is received. The routine 1100 then continues to operation 1104 where the start of the linked list for the provision to be read from is located by using the volume table and system table in the manner described above. From operation 1104, the routine 1100 continues to operation 1106 where the first node in the linked list is designated as a current node.

From operation 1106, the routine 1100 continues to decision operation 1108 where a determination is made as to whether the sequence number for the current node is greater than the current sequence number. The current sequence number is either the sequence number for the current volume or for the snapshot to read from. If the sequence number of the current node is greater than the current sequence number, the routine 1100 branches to operation 1110, where a determination is made as to whether there are additional nodes in the linked list. If no additional nodes exist in the list, the routine 1100 continues to operation 1124, where it ends. A null value may be returned here if no nodes were found having valid data for the read operation. If additional nodes do exist in the list, the routine 1100 continues to operation 1112, where the next node in the list is designated as the current node. The routine 1100 then continues from operation 1112 to operation 1108 where the processing described above takes place. In this manner, a node is identified having a sequence number less than or equal to the current sequence number.

If a node is identified at operation 1108 that has a sequence number less than or equal to the current sequence number, the routine 1100 continues from operation 1108 to operation 1114. At decision operation 1114, a determination is made utilizing the bitmap field of the current node as to whether the provision identified by the node contains valid data for the requested chunk. If the provision does contain valid data, the routine 1100 continues from operation 1114 to operation 1116, where the read operation is performed on the provision identified by the current node. The routine then continues from operation 1116 to operation 1124, where it ends.

If, at operation 1114, it is determined that the chunk in the provision identified by the current node is not valid, the routine 1100 branches to operation 1118. At operation 1118, a determination is made as to whether additional nodes exist in the list. If no additional nodes exist, the routine 1100 continues from operation 1118 to operation 1122 where a null value is returned in response to the read operation. If the end of the list has not been encountered, the routine 1100 branches from operation 1118 to operation 1120 where the next node in the linked list is designated as the current node. The routine 1100 then returns to operation 1108 described above. In this manner, the linked list for the requested provision is iterated to find the provision having a sequence number less than or equal to the current or snapshot provision number and that has valid data for the requested chunk.

Turning now to FIGS. 12A-12B, aspects of the methods provided herein for writing to a logical volume when snapshots are active will be described. In particular, FIG. 12A illustrates the contents of several bitmaps 74D-74F corresponding to a provision written to in three different snapshot lifetimes. The bitmap 74D is for the provision when the sequence number was six, the bitmap 74E is for the provision when the sequence number was four, and the bitmap 74F was for the provision when the sequence number was zero.

FIG. 12B illustrates the bitmaps 74G-74K utilized for the provision following a sub-chunk write request directed to chunk six when the sequence number was ten. When a write request arrives for a particular chunk, the sequence number of the corresponding provision is checked to determine if it is current. If it is not current, a new provision is allocated. In the example shown in FIG. 12B, no provision had been allocated for sequence number ten, so a new provision is allocated. The bitmap 74G corresponds to the newly allocated provision.

Once a provision has been identified, the bitmap for the provision is examined to determine whether the chunk to be written is valid in the provision or not. If the chunk is valid, it has already been redirected to the new provision and the write can take place at the new location. If the chunk is not valid, the write must be redirected. If the write request is exactly equal to the chunk size, the write can be performed in the new location without redirecting the previous data for the chunk to the new location. If the write request is a sub-portion of a chunk, a read is first performed to obtain the data for the chunk from the previous snapshot lifetime, the read data is modified with the data to be written, and the resulting chunk-sized data portion is written to the new location. This process is referred to herein as a read-modify-write operation. The redirection results in the validation of the corresponding chunk in the new provision; hence, the appropriate bit in the bitmap for the new provision is set for the written chunk.

In the examples shown in FIGS. 12A-12B, a new sub-chunk write request is received for chunk six. Since the newest provision has a sequence number (six) that is not current, a new provision is allocated and assigned the current sequence number (ten). The write is not a full-chunk write, so a read-modify-write operation is performed to migrate the contents of chunk six from the lifetime corresponding to sequence number six. After the write has been completed, the appropriate bit may be set in the bitmap 74G corresponding to the new provision. Additional details regarding the processes providing herein for writing to a volume with snapshots enabled are provided below with respect to FIG. 13.

Figure 13:
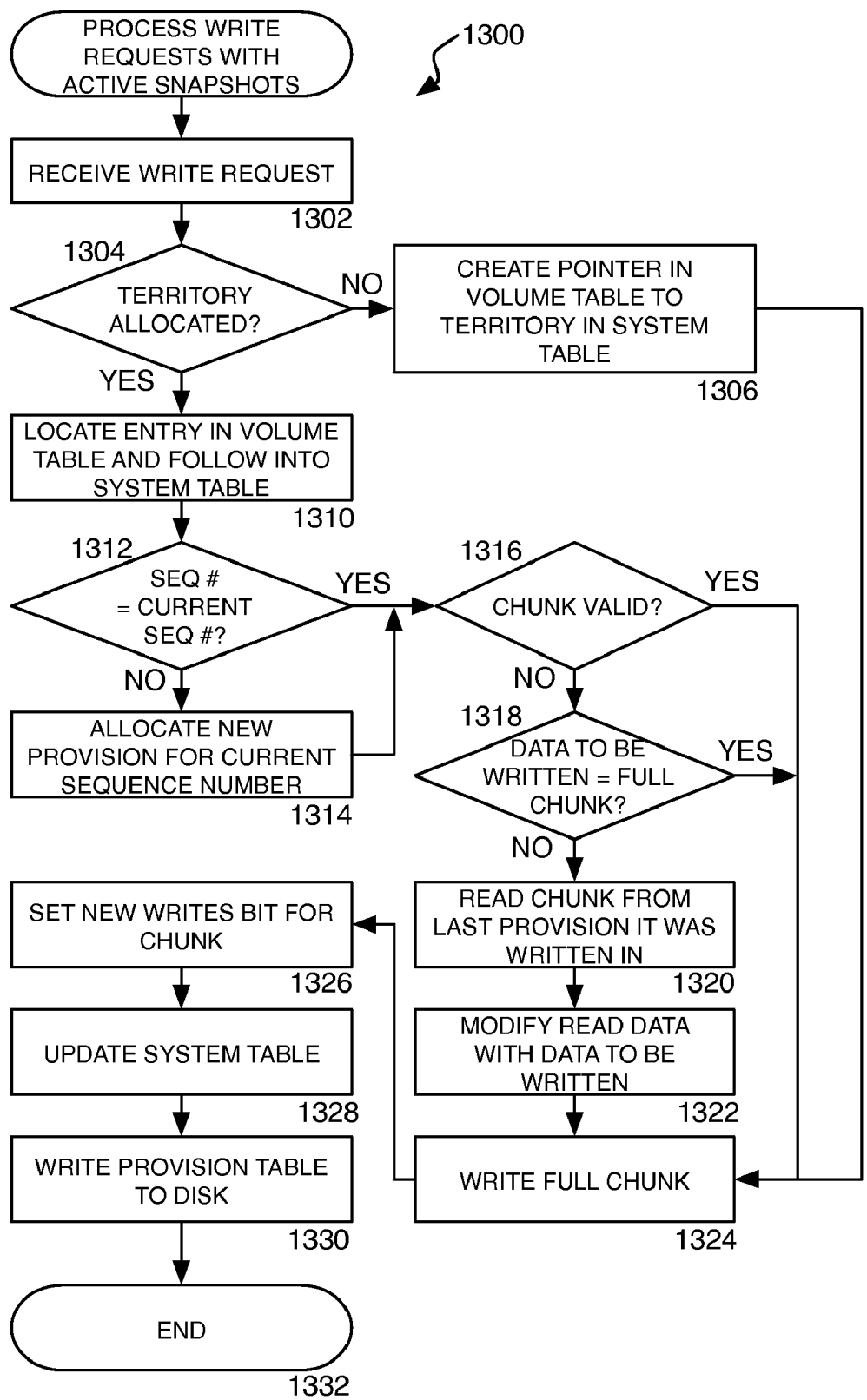
FIG. 13 is a flow diagram illustrating a process for writing to a data storage volume with active snapshots according to one embodiment of the invention.

Referring now to FIG. 13, an illustrative routine 1300 will be described for performing write operations on a volume with snapshots active. The routine 1300 begins at operation 1302, where a write request is received directed to a thin provisioned logical volume with snapshots enabled. The routine 1300 then continues to operation 1304 where a determination is made as to whether physical space has been previously allocated for the territory in which the write is to be made. If physical space has not yet been allocated, the routine 1300 branches to operation 1306, where a new pointer is created in the volume table for the volume directed toward an entry in the system table for an available territory. The routine 1300 then continues to operation 1324, where the requested write operation is performed. Additional details regarding this process are provided below.

If, at operation 1304, it is determined that physical space was previously allocated for the territory to be written, the routine 1300 continues from operation 1304 to operation 1310. At operation 1310, the entry in the volume table for the provision to be written is utilized to locate the head of the linked list in the system table. The routine 1300 then continues to operation 1312, where a determination is made as to whether there exists a provision associated with this logical address with a sequence number that is equal to the current sequence number for this particular volume. If the sequence number for the provision is not current, a new snapshot provision is allocated for the current sequence number at operation 1314. If the sequence number for the provision is current, the routine 1300 branches from operation 1312 to operation 1316.

At operation 1316, a determination is made as to whether the chunk to be written is valid in the current provision. If the chunk is valid, the routine 1300 branches to operation 1324, where the chunk is written. If the chunk is not valid, the routine 1300 continues to operation 1318 where a determination is made as to whether the data to be written to the chunk is a full chunk or a sub-portion of a chunk. If the portion to be written is a full chunk, no data needs to be migrated from the previous snapshot lifetime in which the chunk was valid. Accordingly, the routine 1300 branches from operation 1318 to operation 1324 where the full chunk is written. If the portion is a sub-chunk portion, the routine 1300 continues from operation 1318 to operations 1320, 1322, and 1324, where a read-modify-write operation is performed to migrate the data from the provision in which the chunk was previously valid. From operation 1324, the routine 1300 continues to operations 1326 and 1328, where the bitmap for the new provision and other portions of the system table are updated. From operation 1328, the routine 1300 continues to operation 1330 where the provision table is written to disk. The routine 1300 then continues to operation 1332, where it ends.

Figures 14A, 14B:
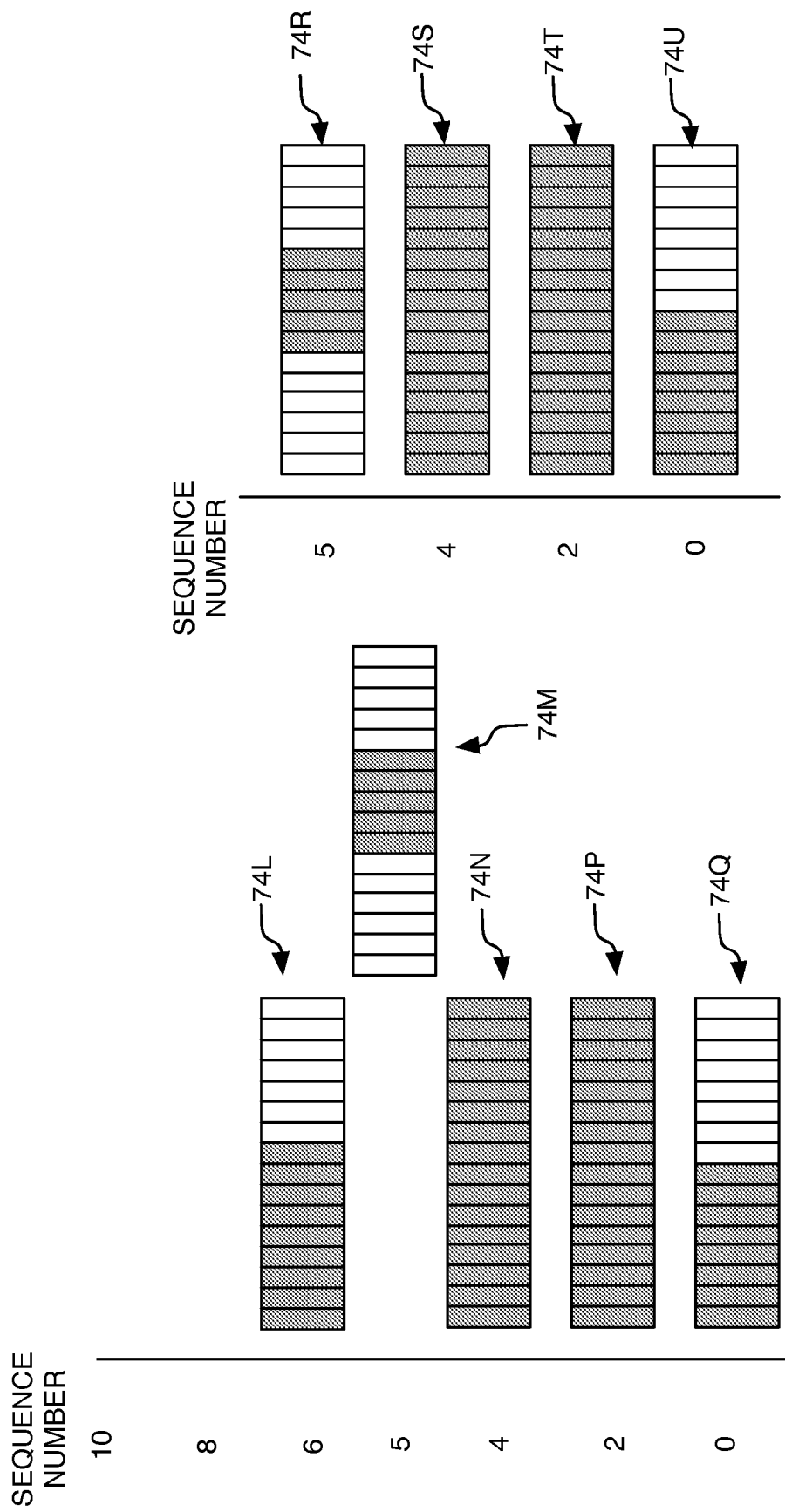
FIGS. 14A-14B are data structure diagrams showing several illustrative new writes bitmaps utilized in conjunction with providing writable snapshots in an embodiment of the invention.

Turning now to FIGS. 14A-14B, additional details will be provided regarding the aspects of the invention for providing writable snapshots. As described briefly above, writable snapshots are volumes that are uniquely associated with a read-only snapshot, and have the same data as the corresponding read-only snapshot, but which can also be written to without affecting either the associated read-only snapshot or the data volume. In order to implement writable snapshots, certain sequence numbers are reserved exclusively for writable snapshots and certain sequence numbers are reserved for read-only snapshots. The sequence numbers for writable snapshots are interspersed among the sequence numbers for readable snapshots. For example, according to one embodiment in which only one writable snapshot is made available per read-only snapshot, each of the odd sequence numbers are reserved for writable snapshots while the even numbers are reserved for read-only snapshots. The writable snapshot has a sequence number that is one higher than its associated read-only snapshot. It should be appreciated that other numbering conventions may be utilized to provide more than one writable snapshot per read-only snapshot and to create snapshots of writable snapshots.

Writable snapshots, in essence, sit on a branch in a territory diagram that is off of the downward flow. Writable snapshots share the same provisions as snapshots having less than or equal sequence numbers, but form an independent tree from the higher sequence numbers. In this manner, a writable snapshot can be considered a data volume that has all of the older snapshots and none of the newer snapshots.

FIGS. 14A and 14B illustrate the concept of writable snapshots further. In particular, FIG. 14A illustrates the concept of a writable snapshot being a branch off of the main tree from which reads are satisfied. In particular, the bitmap 74M corresponds to the provision written during the writable snapshot with the sequence number of five. As a result, reads from the writable snapshot with the sequence number of five do not utilize the contents of the provision written during the lifetime with the sequence number of six. FIG. 14B illustrates the view of the writable snapshot as an independent volume in this regard.

Figure 15:
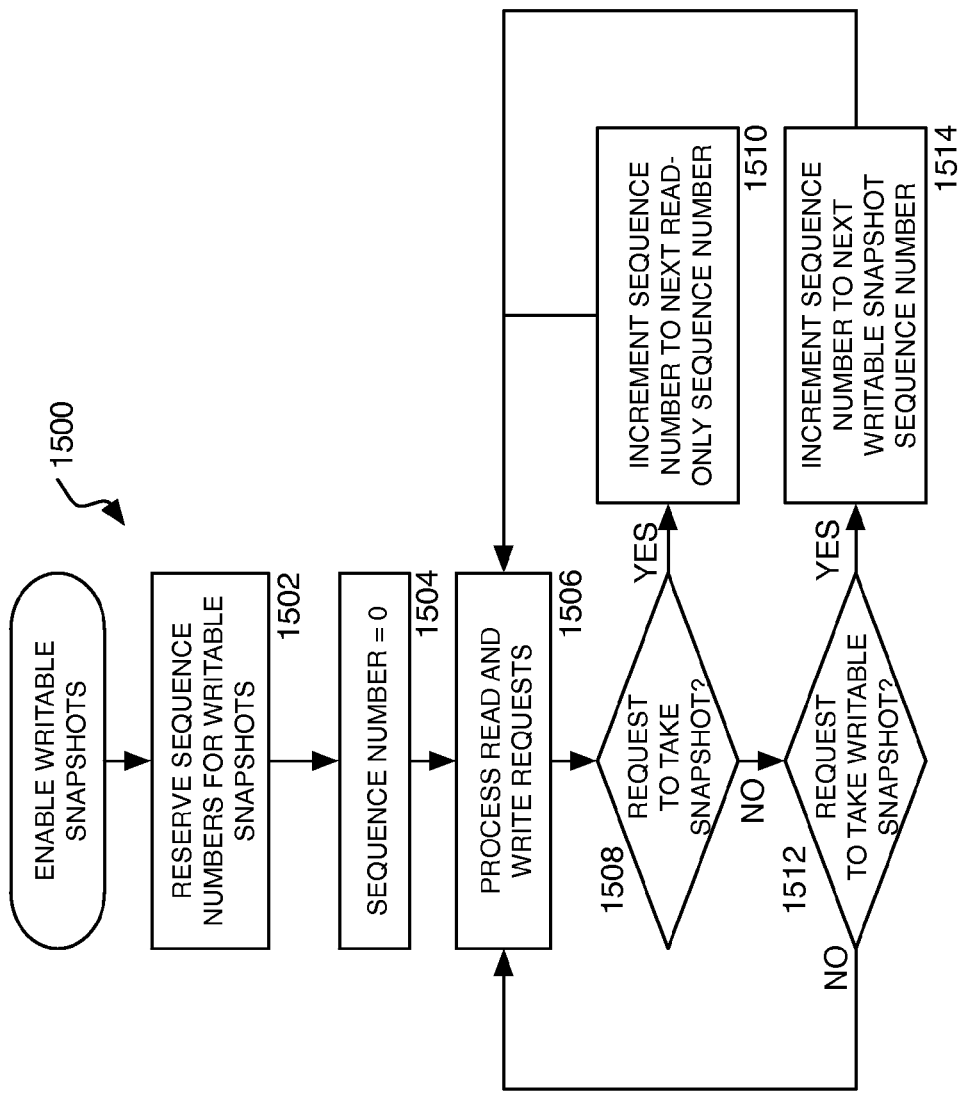
FIG. 15 is a flow diagram illustrating a process for providing writable snapshots according to one embodiment of the invention.

Referring now to FIG. 15, an illustrative routine 1500 will be described for implementing writable snapshots. The routine 1500 begins at operation 1502, where certain sequence numbers are reserved for writable snapshots. As described above, odd sequence numbers are reserved for writable snapshots and even sequence numbers are reserved for read-only snapshots in one embodiment. From operation 1502, the routine 1500 continues to operation 1504, where the current sequence number is initialized to zero. The routine continues to operation 1506, where read and write operations are performed in the manner described above. As mentioned above, in the read and write cycle for writable snapshots, the presence of higher sequence numbers in the system table are ignored and reads and writes are otherwise performed in the same manner as with a read-only volume.

From operation 1506, the routine 1500 continues to operation 1508, where a determination is made as to whether a request has been received, from a system administrator for instance, to take a read-only snapshot. If so, the routine 1500 branches to operation 1510, where the current sequence number is incremented to the next read-only sequence number. The routine 1500 then returns from operation 1510 to operation 1506.

If, at operation 1508, it is determined that a request to take a read-only snapshot has not been received, the routine 1500 continues to operation 1512, where a determination is made as to whether a request has been received to take a writable snapshot. If so, the routine 1500 branches to operation 1514, where the current sequence number is incremented to the next sequence number reserved for writable snapshots. The routine 1500 then returns from operation 1514 to operation 1506. If no request to take a writable snapshot was received at operation 1512, the routine 1500 returns to operation 1506, described above. It should be appreciated that because taking a snapshot only requires incrementing the current sequence number, consecutive snapshots may be taken very quickly.

Turning now to FIGS. 16A-16C, additional details regarding the various processes provided for deleting a snapshot. It should be appreciated that deletion of a snapshot cannot be accomplished by simply deleting all of the provisions with the sequence number of the snapshot to be deleted. This is because some provisions that were created in the lifetime of the snapshot may contain data that is shared with future snapshots. In this case, the future snapshot must take ownership of all of the provisions that it depends upon, allowing only the remaining provisions to be deleted. In other words, as described herein, deletion of a snapshot comprises merging of a snapshot lifetime with the lifetime of the snapshot just succeeding it.

In order to determine whether or not a particular provision may be deleted, the bitmap for the provision must be compared to the bitmap for the immediately newer provision that has the same logical provision number. If a newer provision does not exist, the provision cannot be deleted. If a bit is set in the bitmap for the provision and is also set in the bitmap for the newer provision, this means that the corresponding chunk has been overwritten in the next lifetime and can be deleted. Deletion of a chunk involves only resetting that bit to zero in the bitmap for the provision. If a bit is set in the bitmap for the older provision, but not in the bitmap for the newer provision, this means that ownership of that chunk must be transferred to the newer lifetime, and therefore cannot be deleted.

At the end of the per-chunk operation described above, a new bitmap will exist for the provision, with potentially some bits deleted and some retained. If all of the bits have been deleted, the provision can be freed, for use by other volumes and snapshots. If not all bits were deleted, the provision must be promoted by changing its sequence number to the next possible sequence number. This operation is repeated for all provisions with the sequence number of the snapshot to be deleted. It should be appreciated that because sequence numbers are not reused, the above operations may be completed without having to commit metadata changes to disk. This speeds up snapshot deletions tremendously.

FIGS. 16A-16B illustrate this process further. FIG. 16A, for instance, illustrates the case when there is no provision table for the provision to be deleted. In this case, if a request is received to delete the snapshot with a sequence number of four, then no processing is required. Accordingly, the before and after territory diagrams shown in FIG. 16A are identical. FIG. 16B illustrates the case where the provision table is fully contained within the next higher one. In this case, when a request to delete the snapshot with a sequence number of four is received, the provision may be free. This is illustrated in the after territory diagram shown in FIG. 16B. FIG. 16C illustrates the scenario when the provision table is only partially contained in the next higher one. In this case the bitmap is modified to reflect the newly valid part only. Additional details regarding the embodiments of the invention for deleting a snapshot are provided below with respect to FIG. 17.

Figure 17:
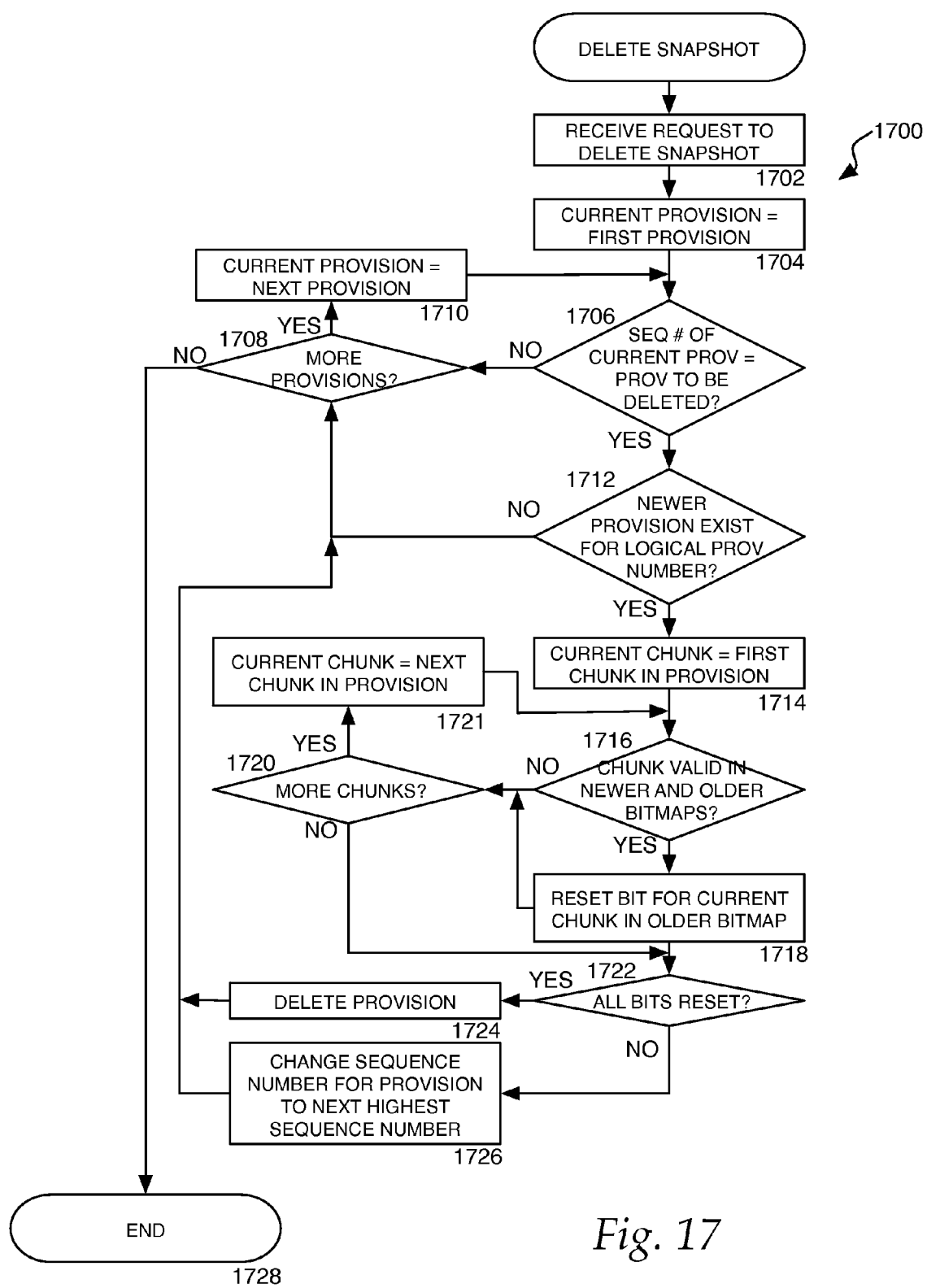
FIG. 17 is a flow diagram illustrating a process for deleting snapshots according to one embodiment of the invention.

Referring now to FIG. 17, an illustrative routine 1700 will be described for deleting a snapshot. The routine 1700 begins at operation 1702, where a request is received to delete a snapshot having an identified sequence number. The routine 1700 then continues to operation 1704, where a variable utilized to keep track of the current provision is initialized to the value of the first provision. From operation 1704, the routine 1700 continues to operation 1706, where a determination is made as to whether the sequence number of the current provision is equal to the sequence number of the provision to be deleted. If not, the routine 1700 branches to operation 1708, where a determination is made as to whether more provisions exist. If so, the routine 1700 branches to operation 1710, where the next provision is identified as the current provision. If not, the routine 1700 continues to operation 1728, where it ends.

If, at operation 1706, it is determined that the sequence number of the current provision is equal to the sequence number of the provision to be deleted, the routine 1700 continues to operation 1712. At operation 1712, a determination is made as to whether a newer provision exists for the logical provision number. If not, the provision cannot be deleted, so the routine branches back to operation 1708, described above. If so, the routine 1700 continues to operation 1714, where a current chunk variable is initialized to the first chunk in the provision. The routine 1700 then continues to operation 1716 where a determination is made as to whether the chunk is valid in the provision and in the immediately newer provision that has the same logical provision number. If it is not valid, and operation 1720 determines that there are more chunks to process, then the routine 1700 continues to operation 1721 where the next chunk in the bitmap is set as the current chunk. If the chunk is valid in the provision and in the immediately newer provision then the routine 1700 continues to operation 1718 where the bit for the chunk in the older bitmap is reset.

When decision operation 1720 determines that there are no more chunks to analyze, the routine 1700 continues to operation 1722 where a determination is made as to whether all of the bits in the bitmap for the provision were reset. If so, the routine 1700 branches to operation 1724 where the provision is deleted. If not, the routine 1700 branches to operation 1726, where the sequence number for the provision is changed to the next highest sequence number. From operations 1724 and 1726, the routine 1700 returns to operation 1708, where more provisions may be processed in the manner described above.

Figure 18A:
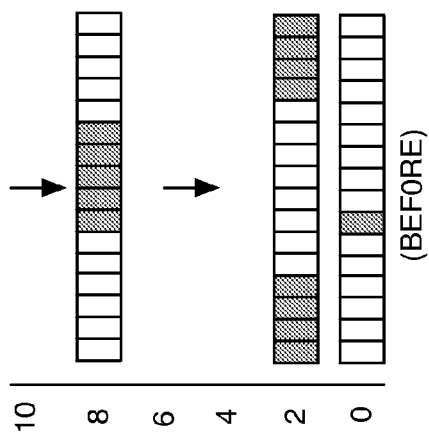
FIGS. 18A-18C are data structure diagrams showing several illustrative new writes bitmaps utilized in conjunction with an operation for rolling back a snapshot in an embodiment of the invention.
Figure 18B:
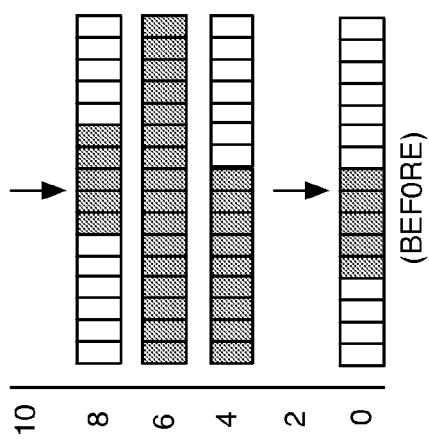
Figure 18C:
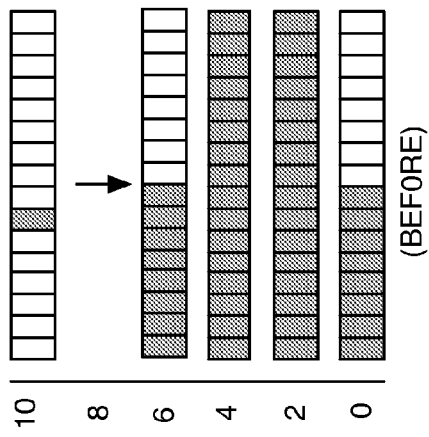

Turning now to FIGS. 18A-18C, additional details will be provided regarding the aspects of the invention for rolling a volume back to a snapshot. Since the rollback of a volume to a snapshot invalidates future snapshots, those provisions may be deleted blindly. Rollback from a read-only snapshot can be performed near-instantaneously, therefore, since the only operation that needs to be performed is to change the sequence number of the currently active volume to the sequence number of the snapshot to roll back to. FIGS. 18A-18C illustrate aspects of the rollback process. In particular, FIGS. 18A-18C illustrate how all of the higher sequence numbers may be deleted in order to roll back a volume.

Figure 19:
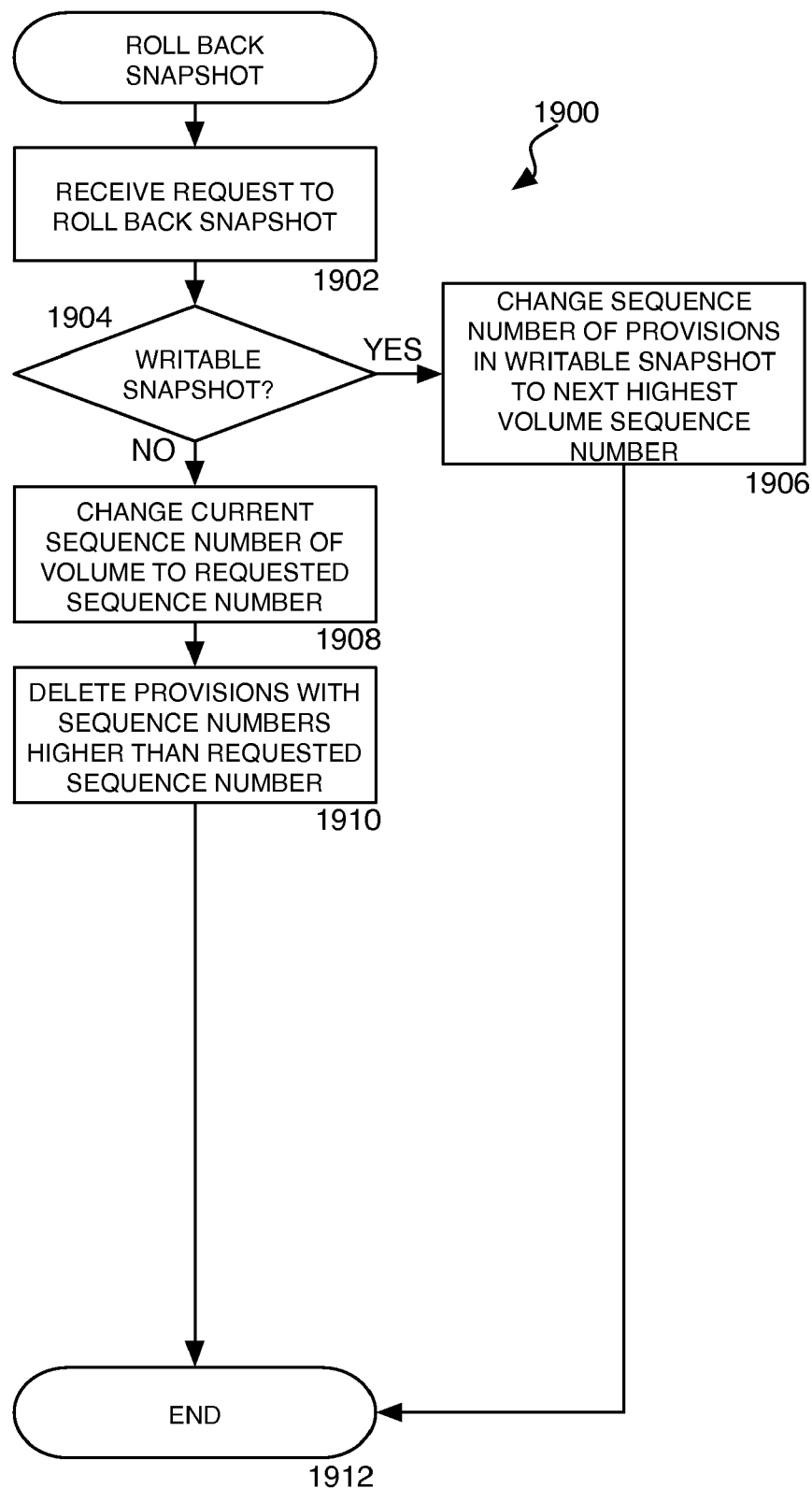
FIG. 19 is a flow diagram illustrating a process for rolling back a snapshot according to one embodiment of the invention.

A volume may also be rolled back to a writable snapshot. In order to accomplish this, each of the provisions that are being rolled back must be changed to the next available read-only snapshot or volume sequence number. This may be performed in the background. As soon as this processing is completed, the snapshot has been rolled back onto the volume. FIG. 19, described below, provides additional details regarding the processes for rolling back snapshots provided herein.

Referring now to FIG. 19, an illustrative routine 1900 will be described for rolling back a snapshot onto a volume. The routine 1900 begins at operation 1902, where a request is received to rollback a snapshot onto a volume. The routine 1900 then continues to operation 1904, where a determination is made as to whether the snapshot to roll back to is a writable snapshot. If so, the routine 1900 branches to operation 1906, where the sequence number of provisions in the writable snapshot are changed to the next highest volume sequence number. This process may occur in the background. From operation 1906, the routine 1900 continues to operation 1912, where it ends.

If, at operation 1904, it is determined that the snapshot to roll back to is a read-only snapshot, the routine 1900 continues from operation 1904 to operation 1908 where the current sequence number of the volume is changed to the sequence number to roll back to. The routine 1900 then continues to operation 1920, where provisions with sequence numbers higher than the sequence number to roll back to are deleted. From operation 1910, the routine 1900 continues to operation 1912, where it ends.

It will be appreciated that embodiments of the present invention provide a method, apparatus, system, and computer-readable medium for taking and managing snapshots in a data storage system. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A data storage system comprising:
   a physical data storage device containing a data storage volume; and
   a computerized controller operable for taking snapshots of a data storage volume, and for maintaining a data structure for one or more provisions in the data storage volume, the data structure comprising a first data field, a second data field, and a third data field,
   wherein the computerized controller stores an increasing sequence number in the first data field that identifies a snapshot lifetime in which the provision was written and whether the identified snapshot lifetime is a read-write snapshot lifetime or a read-only snapshot lifetime, each snapshot lifetime being associated with a different increasing sequence number, stores a bitmap in the second data field that identifies portions of the provision that were written during the snapshot lifetime identified by the first data field, and stores a pointer to a next data structure for another snapshot lifetime for the provision in the third data field.

2. The data storage system of claim 1, wherein the computerized controller is further operable to:
   receive a request to write to a provision;
   examine the contents of the data structure associated with the provision to be written;
   determine, based on the contents of the data structure, if the provision was written to during a previous snapshot lifetime;
   allocate a new provision in response to determining that the provision was written to during a previous snapshot lifetime;
   perform the requested write in the new provision; and
   update metadata related to the requested write.

3. The data storage system of claim 2, wherein the computerized controller is further operable to:
   update the first data field of the data structure associated with the new provision to reflect that the provision was written during a current snapshot lifetime;
   update the second data field of the data structure associated with the new provision to reflect the write to the new provision; and
   update the third data field of the data structure associated with the new provision to point to the data structure for the provision for the previous snapshot lifetime.

4. The data storage system of claim 2, wherein the computerized controller is further operable to:
   allocate a territory for the new provision in response to determining that the provision was not written to during the lifetime of a previous snapshot;
   perform the requested write in the newly allocated territory;
   update the first field of the data structure corresponding to the allocated provision to reflect that the provision was written in the current snapshot lifetime; and
   update the second data field of the data structure corresponding to the allocated provision to reflect the write to the new provision.

5. The data storage system of claim 4, wherein the computerized controller is further operable to:
   determine whether the requested write is for a complete chunk of the provision or only a portion of a chunk; and
   in response to determining that the write is for only a portion of a chunk, perform a read-modify-write operation to migrate the previous contents of the chunk from a previous snapshot lifetime to the current snapshot lifetime.

6. The data storage system of claim 1, wherein the identified snapshot lifetime is a read-write snapshot lifetime when the increasing sequence number is an odd number, and the identified snapshot lifetime is a read-only snapshot lifetime when the increasing sequence number is an even number.

7. The data storage system of claim 1, wherein the identified snapshot lifetime is a read-write snapshot lifetime when the increasing sequence number is an even number, and the identified snapshot lifetime is a read-only snapshot lifetime when the increasing sequence number is an odd number.

8. A method for taking snapshots of a data storage volume, the method comprising:
   maintaining a data structure for one or more provisions in the data storage volume, the data structure comprising a first data field, a second data field, and a third data field;
   storing an increasing sequence number in the first data field that identifies a snapshot lifetime in which the provision was written and whether the identified snapshot lifetime is a read-write snapshot lifetime or a read-only snapshot lifetime, each snapshot lifetime being associated with a different increasing sequence number;
   storing a bitmap in the second data field that identifies portions of the provision that were written during the snapshot lifetime identified by the first data field; and
   storing a pointer to a next data structure for another snapshot lifetime for the provision in the third data field.

9. The method of claim 8, further comprising:
   receiving a request to write to a provision;
   in response to the request, examining the contents of the data structure associated with the provision to be written;
   determining if the provision was written to during a previous snapshot lifetime based on the contents of the data structure;
   allocating a new provision in response to determining that the provision was written to during a previous snapshot lifetime;
   performing the requested write in the new provision; and
   updating metadata related to the requested write.

10. The method of claim 9, wherein updating metadata comprises:
    updating the first data field of the data structure associated with the new provision to reflect that the provision was written during a current snapshot lifetime;
    updating the second data field of the data structure associated with the new provision to reflect the write to the new provision; and
    updating the third data field of the data structure associated with the new provision to point to the data structure for the provision for the previous snapshot lifetime.

11. The method of claim 9, further comprising:
    allocating a territory for the new provision in response to determining that the provision was not written to during the lifetime of a previous snapshot;
    performing the requested write in the newly allocated territory;
    updating the first field of the data structure corresponding to the allocated provision to reflect that the provision was written in the current snapshot lifetime; and
    updating the second data field of the data structure corresponding to the allocated provision to reflect the write to the new provision.

12. The method of claim 11, further comprising prior to performing the requested write:
    determining whether the requested write is for a complete chunk of the provision or only a portion of a chunk; and in response to determining that the write is for only a portion of a chunk, performing a read-modify-write operation to migrate the previous contents of the chunk from a previous snapshot lifetime to the current snapshot lifetime.

13. The method of claim 8, further comprising:
receiving a request to read a portion of a provision;
in response to the read request, locating the appropriate provisional sequence to read the data from; and
performing the requested read on the provision identified by the located data structure.

14. The method of claim 13, wherein locating the appropriate provisional sequence comprises:
iterating through each of the data structures for the provision; and
identifying the data structure having the highest sequence number and having valid data as indicated by the bitmap for the portion to be read.

15. A computer storage medium having computer-executable instructions stored thereon which, when executed by a computer system, cause the computer system to:
maintain a data structure for one or more provisions in the data storage volume, the data structure comprising a first data field, a second data field, and a third data field;
store an increasing sequence number in the first data field that identifies a snapshot lifetime in which the provision was written and whether the identified snapshot lifetime is a read-write snapshot lifetime or a read-only snapshot lifetime;
store a bitmap in the second data field that identifies portions of the provision that were written during the snapshot lifetime identified by the first data field, each snapshot lifetime being associated with a different increasing sequence number; and
store a pointer to a next data structure for another snapshot lifetime for the provision in the third data field.

16. The computer storage medium of claim 15, having additional computer-executable instructions stored thereon, further causing the computer system to:
receive a request to write to a provision;
in response to the request, examine the contents of the data structure associated with the provision to be written;
determine if the provision was written to during a previous snapshot lifetime based on the contents of the data structure;
allocate a new provision in response to determining that the provision was written to during a previous snapshot lifetime;
perform the requested write in the new provision; and
update metadata related to the requested write.

17. The computer storage medium of claim 16, wherein updating metadata comprises:
updating the first data field of the data structure associated with the new provision to reflect that the provision was written during a current snapshot lifetime;
updating the second data field of the data structure associated with the new provision to reflect the write to the new provision; and
updating the third data field of the data structure associated with the new provision to point to the data structure for the provision for the previous snapshot lifetime.

18. The computer storage medium of claim 16, having additional computer-executable instructions stored thereon, further causing the computer system to:
respond to determining that the provision was not written to during the lifetime of a previous snapshot by allocating a territory for the new provision;
perform the requested write in the newly allocated territory;
update the first field of the data structure corresponding to the allocated provision to reflect that the provision was written in the current snapshot lifetime, and
update the second data field of the data structure corresponding to the allocated provision to reflect the write to the new provision.

19. The computer storage medium of claim 18, having additional computer-executable instructions stored thereon, further causing the computer system to:
determine whether the requested write is for a complete chunk of the provision or only a portion of a chunk; and
in response to determining that the write is for only a portion of a chunk, perform a read-modify-write operation to migrate the previous contents of the chunk from a previous snapshot lifetime to the current snapshot lifetime.

20. The computer storage medium of claim 15, having additional computer-executable instructions stored thereon, further causing the computer system to:
receive a request to read a portion of a provision;
locate the appropriate provisional sequence to read the data from in response to the read request; and
perform the requested read on the provision identified by the located data structure.

21. The computer storage medium of claim 20, having additional computer-executable instructions stored thereon, further causing the computer system to:
iterate through each of the data structures for the provision; and
identify the data structure having the highest sequence number and having valid data as indicated by the bitmap for the portion to be read.

* * * * *